United States Patent
Raffle et al.

(10) Patent No.: US 9,454,288 B2
(45) Date of Patent: Sep. 27, 2016

(54) ONE-DIMENSIONAL TO TWO-DIMENSIONAL LIST NAVIGATION

(71) Applicant: Google Inc., Mountain View, CA (US)

(72) Inventors: Hayes Solos Raffle, Palo Alto, CA (US); Nirmal Patel, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 381 days.

(21) Appl. No.: 13/890,049

(22) Filed: May 8, 2013

(65) Prior Publication Data
US 2014/0098102 A1 Apr. 10, 2014

Related U.S. Application Data

(60) Provisional application No. 61/710,543, filed on Oct. 5, 2012.

(51) Int. Cl.
| | |
|---|---|
| *G06T 11/20* | (2006.01) |
| *G06F 3/0482* | (2013.01) |
| *G06F 3/0484* | (2013.01) |
| *G06F 3/0483* | (2013.01) |

(52) U.S. Cl.
CPC ............ *G06F 3/0482* (2013.01); *G06F 3/0483* (2013.01); *G06F 3/0484* (2013.01); *G06T 11/206* (2013.01); *G06F 2203/04806* (2013.01)

(58) Field of Classification Search
CPC ...................................................... G06T 11/20
USPC ......................................................... 345/440
See application file for complete search history.

(56) References Cited

U.S. PATENT DOCUMENTS

| | | | |
|---|---|---|---|
| 6,768,999 B2 | 7/2004 | Prager et al. | |
| 8,099,680 B1 | 1/2012 | Kolde et al. | |
| 8,306,982 B2 | 11/2012 | Audet | |
| 2002/0113912 A1* | 8/2002 | Wright et al. ................ | 349/13 |
| 2005/0102634 A1 | 5/2005 | Sloo | |
| 2006/0156228 A1* | 7/2006 | Gallo .................... | G06F 3/0481 715/202 |
| 2006/0161868 A1* | 7/2006 | Van Dok ............... | G06F 3/0481 715/835 |
| 2008/0007570 A1* | 1/2008 | Wessel et al. ............... | 345/661 |
| 2008/0276196 A1* | 11/2008 | Tang ............................ | 715/800 |
| 2009/0049083 A1* | 2/2009 | Paschalakis ....... | G06F 17/30274 |
| 2010/0017733 A1* | 1/2010 | Barros .............. | G06F 17/30241 715/766 |
| 2010/0060666 A1* | 3/2010 | Fong ........................... | 345/661 |
| 2010/0095240 A1* | 4/2010 | Shiplacoff ............ | G06F 3/0483 715/784 |

(Continued)

OTHER PUBLICATIONS

International Search Report and Written Opinion for PCT/US2013/063550 dated Apr. 7, 2015.

*Primary Examiner* — Javid A Amini
(74) *Attorney, Agent, or Firm* — McDonnell Boehnen Hulbert & Berghoff

(57) ABSTRACT

Methods, apparatus, and computer-readable media are described herein related to a user interface (UI) for a computing device, such as a head-mountable device (HMD). The computing device can display a first card of an ordered plurality of cards using a timeline display. The computing device can receive a first input and, responsively determine a group of cards for a grid view and display the grid view. The group of cards can include the first card. The grid view can include the group of cards arranged in a grid and be focused on the first card. The computing device can receive a second input, and responsively modify the grid view and display the modified grid view. The modified grid view can be focused on a second card. The computing device can receive a third input and responsively display the timeline display, where the timeline display includes the second card.

18 Claims, 20 Drawing Sheets

(56) References Cited

U.S. PATENT DOCUMENTS

| | | | |
|---|---|---|---|
| 2011/0078626 A1* | 3/2011 | Bachman | G06F 17/30053 715/810 |
| 2011/0289459 A1* | 11/2011 | Athans et al. | 715/854 |
| 2011/0296351 A1* | 12/2011 | Ewing et al. | 715/841 |
| 2012/0182316 A1* | 7/2012 | Moha | G06F 17/30274 345/636 |
| 2013/0028400 A1* | 1/2013 | Fix et al. | 379/88.13 |
| 2013/0136411 A1* | 5/2013 | Herby | H04N 5/76 386/230 |
| 2014/0053200 A1* | 2/2014 | de Paz | H04N 5/44 725/44 |

* cited by examiner

Multi-Tiered User Model 400

Basic

| | |
|---|---|
| Tap | = Select |
| Swipe forward/away | = Choose next |
| Swipe backward/toward | = Choose previous |
| Swipe down | = Back/Home/Sleep |
| | |
| Voice | = Access voice menu |
| Camera button press | = Take a photo |

Intermediate

| | |
|---|---|
| Tap | = Select |
| Swipe forward/away | = Choose next |
| Swipe backward/toward | = Choose previous |
| Swipe down | = Back/Home/Sleep |
| | |
| Voice | = Access voice menu |
| Camera button press | = Take a photo |
| Camera button long press | = Capture menu |
| | |
| Two finger swipe forward/away | = Z-axis move away |
| Two finger swipe backward/toward | = Z-axis move toward |
| Two finger swipe down | = Sleep |

Advanced

| | |
|---|---|
| Tap | = Select |
| Swipe forward/away | = Choose next |
| Swipe backward/toward | = Choose previous |
| Swipe down | = Back/Home/Sleep |
| | |
| Voice | = Access to voice menu |
| Camera button press | = Take a photo |
| Camera button long press | = Capture menu |
| | |
| Two finger swipe forward/away | = Z-axis move away |
| Two finger swipe backward/toward | = Z-axis move toward |
| Two finger swipe down | = Sleep |
| | |
| Two finger press and hold | = The clutch |
| | |
| Nudge | = HMD wake / sleep |

FIG. 4

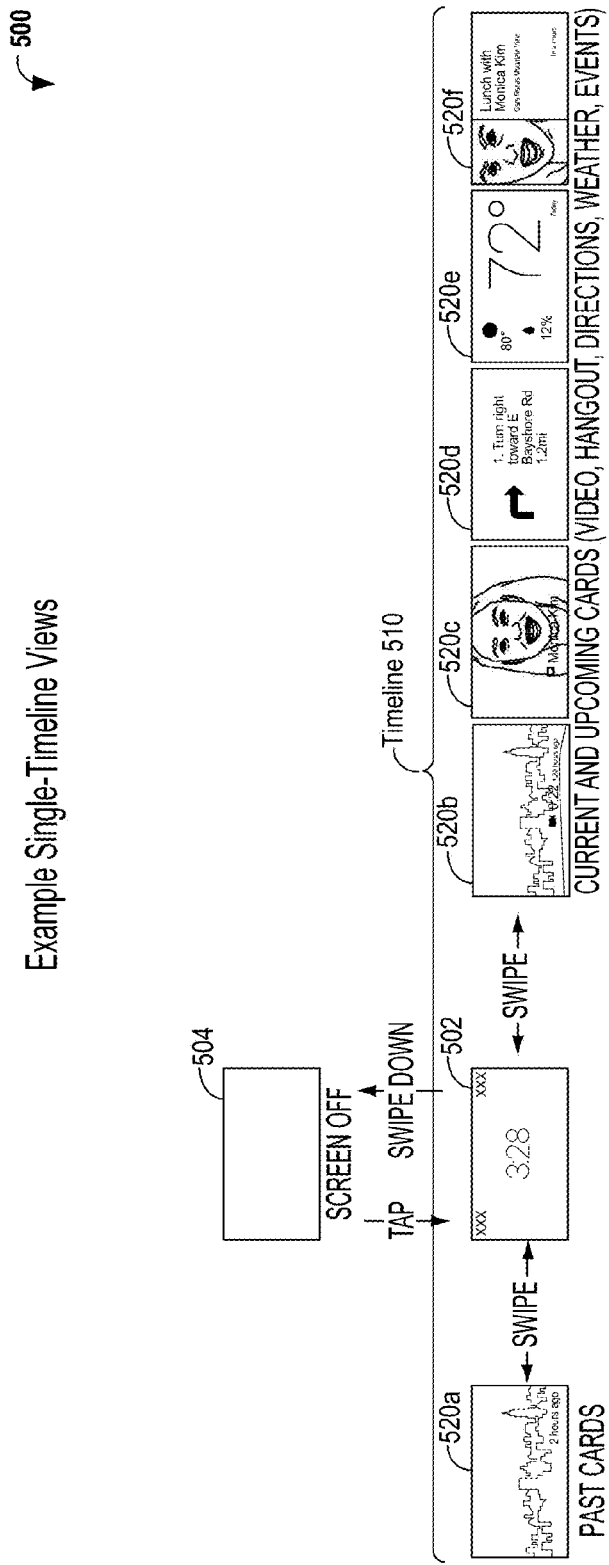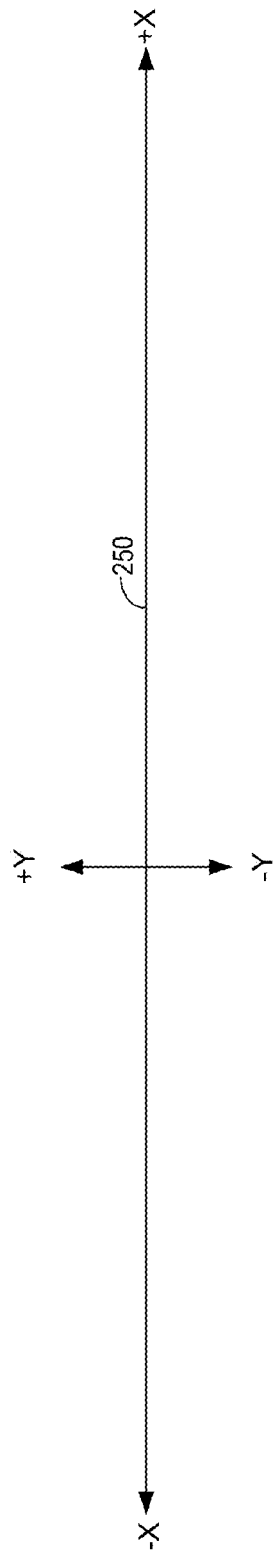
FIG. 5

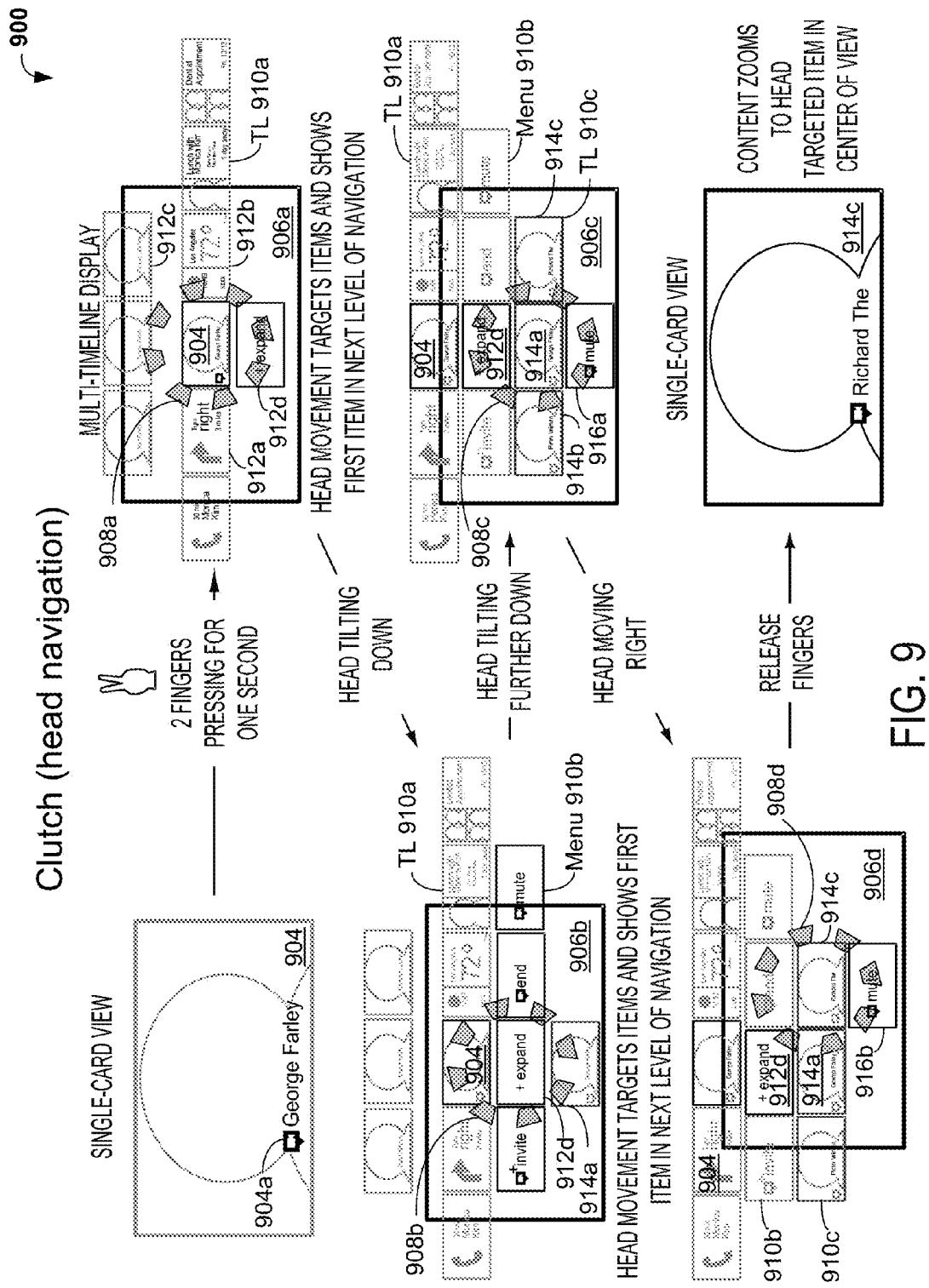

ONE-DIMENSIONAL TO TWO-DIMENSIONAL LIST NAVIGATION

CROSS-REFERENCE TO RELATED APPLICATIONS

This application claims priority to U.S. Patent App. No. 61/710,543, entitled "User Interfaces for Head-Mountable Devices", filed on Oct. 5, 2012, the contents of which are fully incorporated by referenced herein for all purposes.

BACKGROUND

Unless otherwise indicated herein, the materials described in this section are not prior art to the claims in this application and are not admitted to be prior art by inclusion in this section.

Computing systems such as personal computers, laptop computers, tablet computers, cellular phones, and countless types of Internet-capable devices are prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mounted displays" (HMDs). A head-mounted display places a graphic display or displays close to one or both eyes of a wearer. To generate the images on a display, a computer processing system may be used. Such displays may occupy part or all of a wearer's field of view. Further, head-mounted displays may be as small as a pair of glasses or as large as a helmet.

SUMMARY

In one aspect, a method is provided. A computing device displays a first card of an ordered plurality of cards using a timeline display. Each card is associated with a displayable item. The computing device receives a first input while displaying the timeline display. In response to the first input, the computing device determines a group of one or more cards for display in a grid view, where the group of one or more cards includes the first card. The computing device displays the grid view including the group of one or more cards. The grid view includes the one or more cards arranged in a grid having two or more rows and two or more columns. The grid view is focused on the first card. The computing device receives a second input while displaying the grid view. In response to the second input, the computing device modifies the grid view, where the modified grid view is focused on a second card, and displays the modified grid view. The computing device receives a third input while displaying the modified grid view. In response to the third input, the computing device displays the timeline display, where the timeline display includes a display of the second card.

In another aspect, a non-transitory computer-readable storage medium is provided. The non-transitory computer-readable storage medium has stored thereon program instructions that, upon execution by a processor of a computing device, cause the computing device to perform functions. The functions include: displaying a first card of an ordered plurality of cards using a timeline display, each card associated with a displayable item; while displaying the timeline display, receiving a first input; in response to the first input: determining a group of one or more cards for display in a grid view, where the group of one or more cards includes the first card, and displaying the grid view including the group of one or more cards, where the grid view includes the one or more cards arranged in a grid having two or more rows and two or more columns and the grid view is focused on the first card; while displaying the grid view, receiving a second input; in response to the second input: modifying the grid view, where the modified grid view is focused on a second card, and displaying the modified grid view; while displaying the modified grid view, receiving a third input; and in response to the third input: displaying the timeline display, where the timeline display includes a display of the second card.

In another aspect, a computing device is provided. The computing device includes a processor and a computer-readable storage medium. The computer-readable storage medium has stored thereon program instructions that, upon execution by the processor of the computing device, cause the computing device to perform functions. The functions include: displaying a first card of an ordered plurality of cards using a timeline display, each card associated with a displayable item; while displaying the timeline display, receiving a first input; in response to the first input: determining a group of one or more cards for display in a grid view, where the group of one or more cards includes the first card, and displaying the grid view including the group of one or more cards, where the grid view includes the one or more cards arranged in a grid having two or more rows and two or more columns and the grid view is focused on the first card; while displaying the grid view, receiving a second input; in response to the second input: modifying the grid view, where the modified grid view is focused on a second card, and displaying the modified grid view; while displaying the modified grid view, receiving a third input; and in response to the third input: displaying the timeline display, where the timeline display includes a display of the second card.

In another aspect, an apparatus is provided. The apparatus includes: means for displaying a first card of an ordered plurality of cards using a timeline display, each card associated with a displayable item; means for, while displaying the timeline display, receiving a first input; means for, in response to the first input: determining a group of one or more cards for display in a grid view, where the group of one or more cards includes the first card, and displaying the grid view including the group of one or more cards, where the grid view includes the one or more cards arranged in a grid having two or more rows and two or more columns and the grid view is focused on the first card; means for, while displaying the grid view, receiving a second input; means for, in response to the second input: modifying the grid view, where the modified grid view is focused on a second card, and displaying the modified grid view; means for, while displaying the modified grid view, receiving a third input;

and in response to the third input: displaying the timeline display, where the timeline display includes a display of the second card.

In yet another aspect, a method is provided. A computing device displays a first card of an ordered plurality of cards using a single-timeline display. Each card is associated with a displayable item. The computing device receives a first input while displaying the single-timeline display. In response to the first input, the computing device: determines a group of one or more cards for display in a multi-timeline view, where the group of one or more cards includes the first card, where the multi-timeline view includes the group of one or more cards arranged in at least a first timeline and a second timeline, and where the first timeline includes the first card; and displays the multi-timeline view. The multi-timeline view includes an active-card indicator, the first timeline, and the second timeline. The active-card indicator is displayed at a first position on the first card. The computing device receives a second input while displaying the multi-timeline view. In response to the second input, the computing device: moves the active-card indicator to a second position in the second timeline, where a second card is at the second position, and modifies the multi-timeline view to include a third timeline to the multi-timeline view. The third timeline is positioned within the multi-timeline view based on the second position. The computing device displays the modified multi-timeline view. The modified multi-timeline view includes the active-card indicator, the second timeline, and the third timeline. The active-card indicator is displayed at the second position on the second card. The computing device receives a third input while displaying the modified multi-timeline view. In response to the third input, the computing device displays the single-timeline display, where the timeline display includes a display of the second card.

In another aspect, a non-transitory computer-readable storage medium is provided. The non-transitory computer-readable storage medium has stored thereon program instructions that, upon execution by a processor of a computing device, cause the computing device to perform functions. The functions include: displaying a first card of an ordered plurality of cards using a single-timeline display, each card associated with a displayable item; while displaying the single-timeline display, receiving a first input; in response to the first input: determining a group of one or more cards including the first card for display in a multi-timeline view, where the multi-timeline view includes the group of one or more cards arranged in at least a first timeline and a second timeline, the first timeline including the first card, and displaying the multi-timeline view, where the multi-timeline view includes an active-card indicator, the first timeline, and the second timeline, and where the active-card indicator is displayed at a first position on the first card; while displaying the multi-timeline view, receiving a second input; in response to the second input: moving the active-card indicator to a second position in the second timeline, where a second card is at the second position, modifying the multi-timeline view to include a third timeline to the multi-timeline view, where the third timeline is positioned within the multi-timeline view based on the second position, and displaying the modified multi-timeline view, where the modified multi-timeline view includes the active-card indicator, the second timeline, and the third timeline, and where the active-card indicator is displayed at the second position on the second card; while displaying the modified multi-timeline view, receiving a third input; and in response to the third input: displaying the single-timeline display, wherein the single-timeline display comprises a display of the second card.

In another aspect, a computing device is provided. The computing device includes a processor and a computer-readable storage medium. The computer-readable storage medium has stored thereon program instructions that, upon execution by the processor of the computing device, cause the computing device to perform functions. The functions include: displaying a first card of an ordered plurality of cards using a single-timeline display, each card associated with a displayable item; while displaying the single-timeline display, receiving a first input; in response to the first input: determining a group of one or more cards including the first card for display in a multi-timeline view, where the multi-timeline view includes the group of one or more cards arranged in at least a first timeline and a second timeline, the first timeline including the first card, and displaying the multi-timeline view, where the multi-timeline view includes an active-card indicator, the first timeline, and the second timeline, and where the active-card indicator is displayed at a first position on the first card; while displaying the multi-timeline view, receiving a second input; in response to the second input: moving the active-card indicator to a second position in the second timeline, where a second card is at the second position, modifying the multi-timeline view to include a third timeline to the multi-timeline view, where the third timeline is positioned within the multi-timeline view based on the second position, and displaying the modified multi-timeline view, where the modified multi-timeline view includes the active-card indicator, the second timeline, and the third timeline, and where the active-card indicator is displayed at the second position on the second card; while displaying the modified multi-timeline view, receiving a third input; and in response to the third input: displaying the single-timeline display, wherein the single-timeline display comprises a display of the second card.

In another aspect, an apparatus is provided. The apparatus includes: means for displaying a first card of an ordered plurality of cards using a single-timeline display, each card associated with a displayable item; means for, while displaying the single-timeline display, receiving a first input; in response to the first input: determining a group of one or more cards including the first card for display in a multi-timeline view, where the multi-timeline view includes the group of one or more cards arranged in at least a first timeline and a second timeline, the first timeline including the first card, and displaying the multi-timeline view, where the multi-timeline view includes an active-card indicator, the first timeline, and the second timeline, and where the active-card indicator is displayed at a first position on the first card; means for, while displaying the multi-timeline view, receiving a second input; means for, in response to the second input: moving the active-card indicator to a second position in the second timeline, where a second card is at the second position, modifying the multi-timeline view to include a third timeline to the multi-timeline view, where the third timeline is positioned within the multi-timeline view based on the second position, and displaying the modified multi-timeline view, where the modified multi-timeline view includes the active-card indicator, the second timeline, and the third timeline, and where the active-card indicator is displayed at the second position on the second card; means for, while displaying the modified multi-timeline view, receiving a third input; and means for, in response to the third input: displaying the single-timeline display, wherein the single-timeline display comprises a display of the second card.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrative embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 4 shows example operations of a multi-tiered user model for a user interface for a HMD, according to an example embodiment.

FIG. 5 shows a scenario of example of interactions with a single timeline of cards, according to an example embodiment.

FIG. 9 shows a scenario for using head movements to navigate a multi-timeline view, according to an example embodiment.

DETAILED DESCRIPTION

A. Overview

Figure 1A:
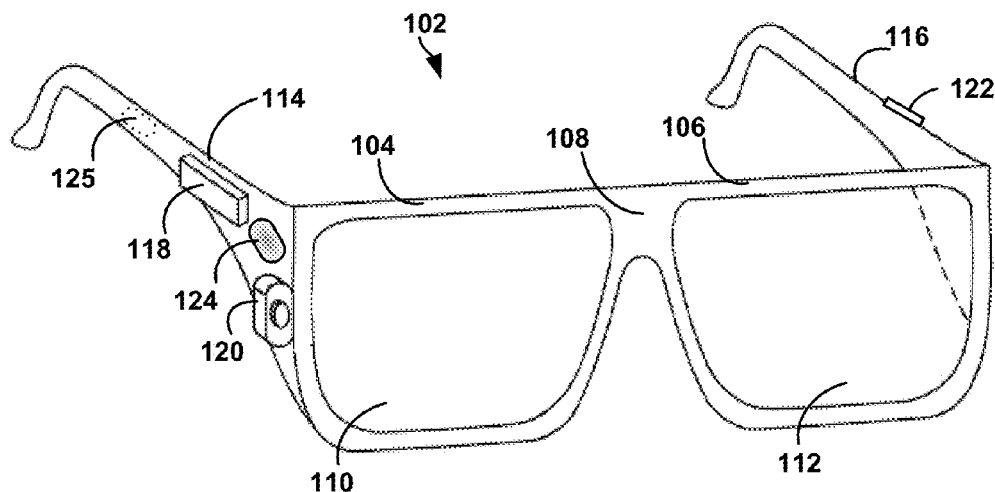
FIG. 1A illustrates a wearable computing system according to an example embodiment.

Many example graphical user interfaces (GUIs) provide information and/or allow for user interaction in two dimensions. The two dimensions can be identified as the X dimension and the Y dimension, where the X dimension is for horizontal or left-right movement, and Y dimension is for vertical or up-down movement.

For example, a GUI for an HMD or other computing device may include a two-dimensional timeline feature that allows the wearer to navigate through a sequence of ordered images arranged along an X-axis representing time. In the context of such a timeline feature, each image may be referred to as a "card." Among the sequence of cards, one or more cards can be displayed, and of the displayed card(s), one card can be "focused on" for possible selection.

In some scenarios, a timeline can be displayed as a one-dimensional array of cards organized by time; e.g., a row of cards with time increasing from as cards progress from left to right across the display. In some examples, the timeline can present a single-card view with one card displayed, with the card being both displayed and focused upon.

In some scenarios, a large number of cards can be available for display and other uses by the computing device. For example, cards can accumulate over time as a wearer uses the HMD on a regular basis. As another example, the wearer may generate a number of cards related to some activity or event; e.g., cards representing images/videos of a first child, vacation images, videos, and messages, messages and other media related to coordinating a work-related conference/meeting. To interact with the large number of cards, the UI of the HMD can generate and utilize multi-card displays where multiple cards are visible at the same time. The UI can permit operations for selecting a card to work with within the multi-card display, working with cards (e.g., sharing cards, editing cards, deleting cards), reviewing cards not shown within the multi-card display, and switching between single-card and multi-card displays. In particular examples, multiple cards can be displayed in a multi-card view until a card is selected; then the selected card can be displayed using a single-card view that occupies substantially all of the viewing area of the display. Many other operations related to multi-card displays are possible as well.

A multi-card display can, for example, be a one-dimensional view or a two-dimensional (2D) view. A one-dimensional multi-card display can show cards in a row or column, permit navigation or movement among the cards by moving left and right along the row or up and down the column, enable selection of a card, and then indicate operations for working with a selected card.

A two-dimensional view can display cards using various display techniques. Specific two-dimensional views can include a grid view and a multi-timeline view, among other possibilities. In a grid view, cards are displayed in a matrix formation. Cards can be selected for the grid view based on a variety of criteria; examples include but are not limited to criteria based on time, location(s) associated with cards displayed in the grid view, type(s) of object represented by the card, and operation(s) that can be performed on card(s). The multi-timeline view can display multiple timelines of cards, where each timeline of cards can include cards selected and/or arranged by the criteria indicated for grid view selection and perhaps for additional and/or differing criteria. Each timeline can be a one-dimensional array; e.g., a row or column, of cards to be displayed.

Groups of cards that represent a same type of object can be collected into a "bundle". For example, a collection of photos captured within a certain span of time can be represented as a photo bundle. As another example, a collection of messages (e.g. an instant messaging session, SMS/text-message exchange, or e-mail chain) can be represented as a message bundle. A "bundle card" can be constructed for display on the timeline that represents the bundle and, in some cases, summarizes the bundle; e.g., shows thumbnail photos of photos in a photo bundle.

In the multi-timeline view, timelines can be added and/or deleted based on navigation, or wearer-selected movements and card selections. For example, a wearer can select a bundle card and, upon bundle card selection in the multi-timeline view, some or all of the cards represented by the bundle card can be displayed in a new timeline of cards. As another example, a card representing a photo can be selected by the wearer. Upon selection of the photo card, a "menu", or group of "action cards" that represent actions that can be performed by the HMD. Action cards can include actions specifically related to the photo card; e.g., share the photo, edit the photo, delete the photo, etc. A menu of action cards can be displayed in a linear arrangement such as utilized by any other timeline; in these embodiments, the term menu can describe a timeline that includes only action cards.

Using two-dimensional views of card can increase the number of cards a wearer can observe at one time, making use of the user interface more efficient. Also by viewing multiple cards simultaneously in two dimensions, the wearer may be able to better utilize the computing device. Displaying cards in grid views can be an intuitive technique for displaying multiple cards. And the use of multi-timeline views can provide interesting arrangements of cards and enable ready review and selection of actions associated with a selected card.

B. Example Wearable Computing Devices

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable device (HMD).

An example system may also be implemented in or take the form of other devices, such as a mobile phone, among other possibilities. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touchpad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touchpad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touchpad 124 is shown on the extending side-arm 114 of the HMD 102. However, the finger-operable touchpad 124 may be positioned on other parts of the HMD 102. Also, more than one finger-operable touchpad may be present on the HMD 102. The finger-operable touchpad 124 may be used by a user to input commands. The finger-operable touchpad 124 may sense at least one of a pressure, position and/or a movement of one or more fingers via capacitive sensing, resistance sensing, or a surface acoustic wave process, among other possibilities. The finger-operable touchpad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touchpad surface. In some embodiments, the finger-operable touchpad 124 may be formed of one or more translucent or transparent insulating layers and one or more translucent or transparent conducting layers. Edges of the finger-operable touchpad 124 may be formed to have a raised, indented, or roughened surface, so as to provide tactile feedback to a user when the user's finger reaches the edge, or other area, of the finger-operable touchpad 124. If more than one finger-operable touchpad is present, each finger-operable touchpad may be operated independently, and may provide a different function.

In some embodiments, hand or finger based inputs that can be received via touchpad 124 can be received using one or more hand-movement input devices configured to detect hand movements and/or finger movements and provide corresponding hand-movement data, such as but not limited to, buttons, touch screens, computer mice, gesture sensors, free space/3D gesture sensors, virtual reality gloves, other types of gloves, cameras, optical gesture sensors, non-contact electrostatic gesture sensors, a magnetometer detecting a moving magnetic field controlled by a wearer; e.g., a ring having a magnetic field being worn and moved by the wearer, and infrared sensors/sensor arrays.

In a further aspect, HMD 102 may be configured to receive user input in various ways, in addition or in the alternative to user input received via finger-operable touchpad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) that may be used to track eye movements and/or determine the direction of a wearer's gaze. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
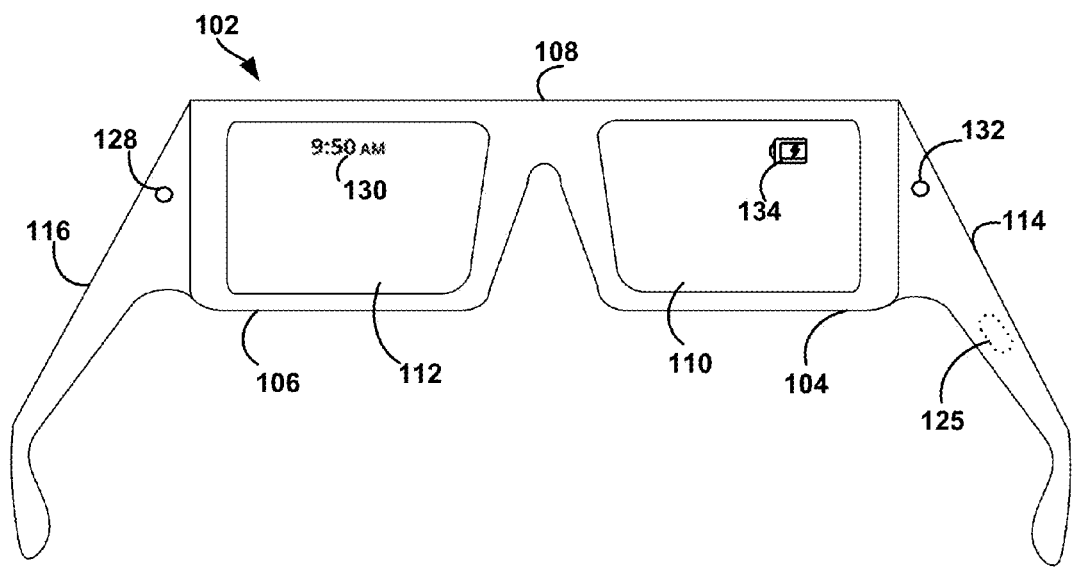
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
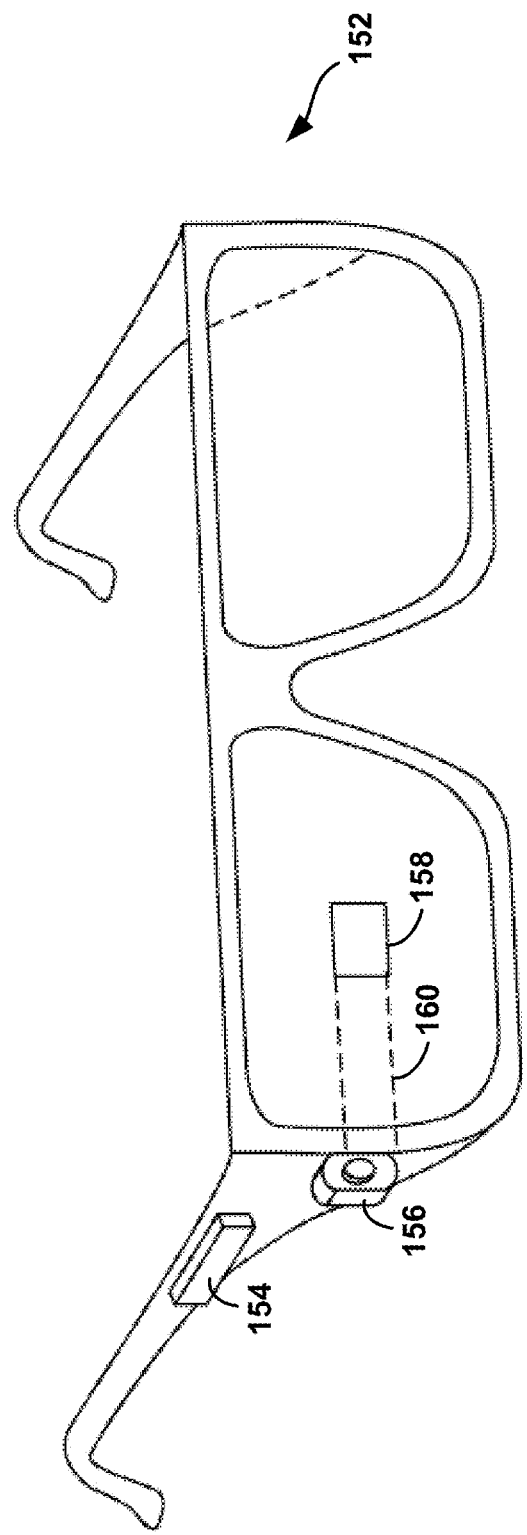
FIG. 1C illustrates another wearable computing system according to an example embodiment.

FIG. 1C illustrates another wearable computing system according to an example embodiment, which takes the form of an HMD 152. The HMD 152 may include frame elements and side-arms such as those described with respect to Figures 1A and 1B. The HMD 152 may additionally include an on-board computing system 154 and an image capture device 156, such as those described with respect to Figures 1A and 1B. The image capture device 156 is shown mounted on a frame of the HMD 152. However, the image capture device 156 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
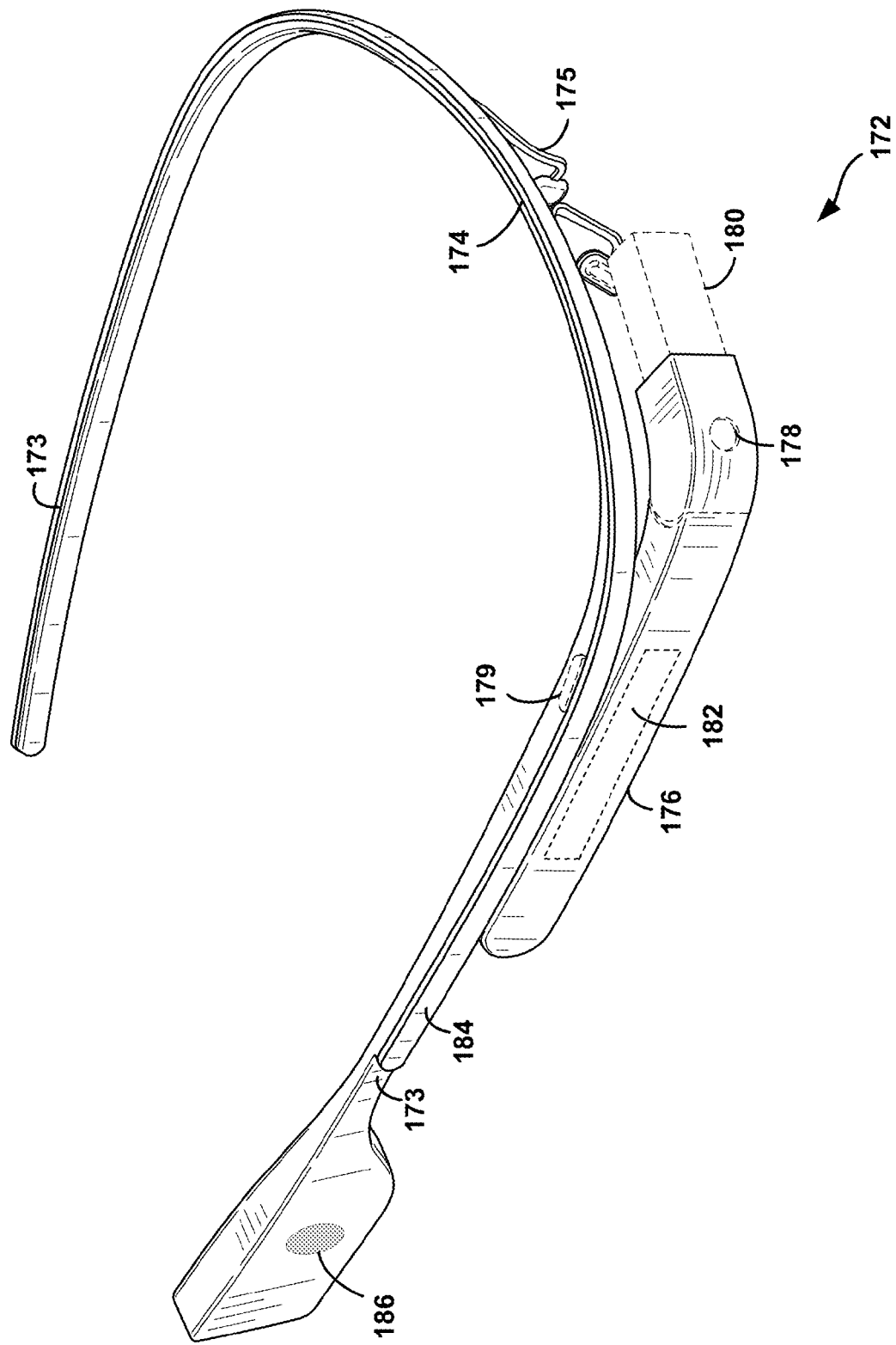
FIG. 1D illustrates another wearable computing system according to an example embodiment.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
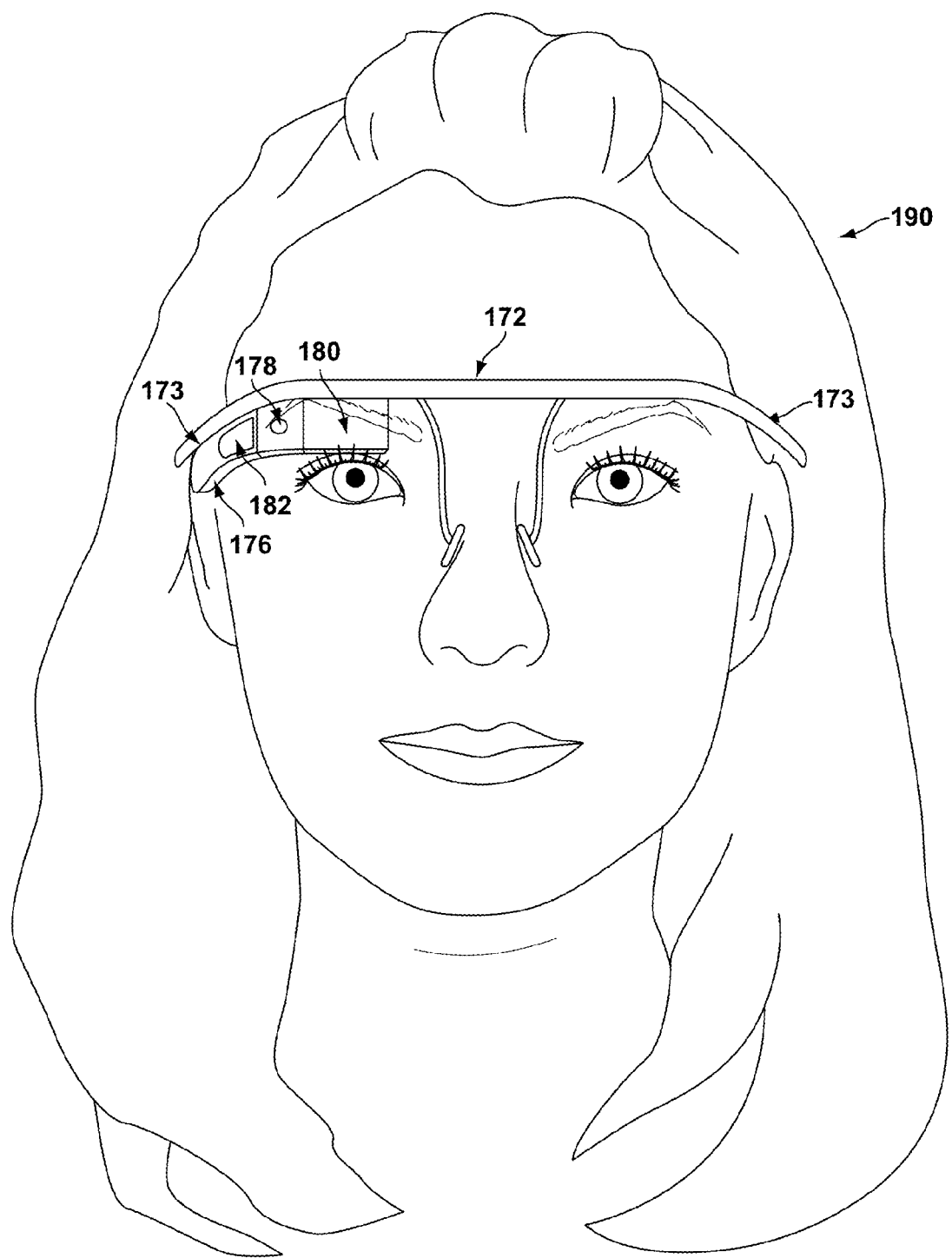
FIGS. 1E to 1G are simplified illustrations of the wearable computing system shown in FIG. 1D, being worn by a wearer.
Figure 1F:
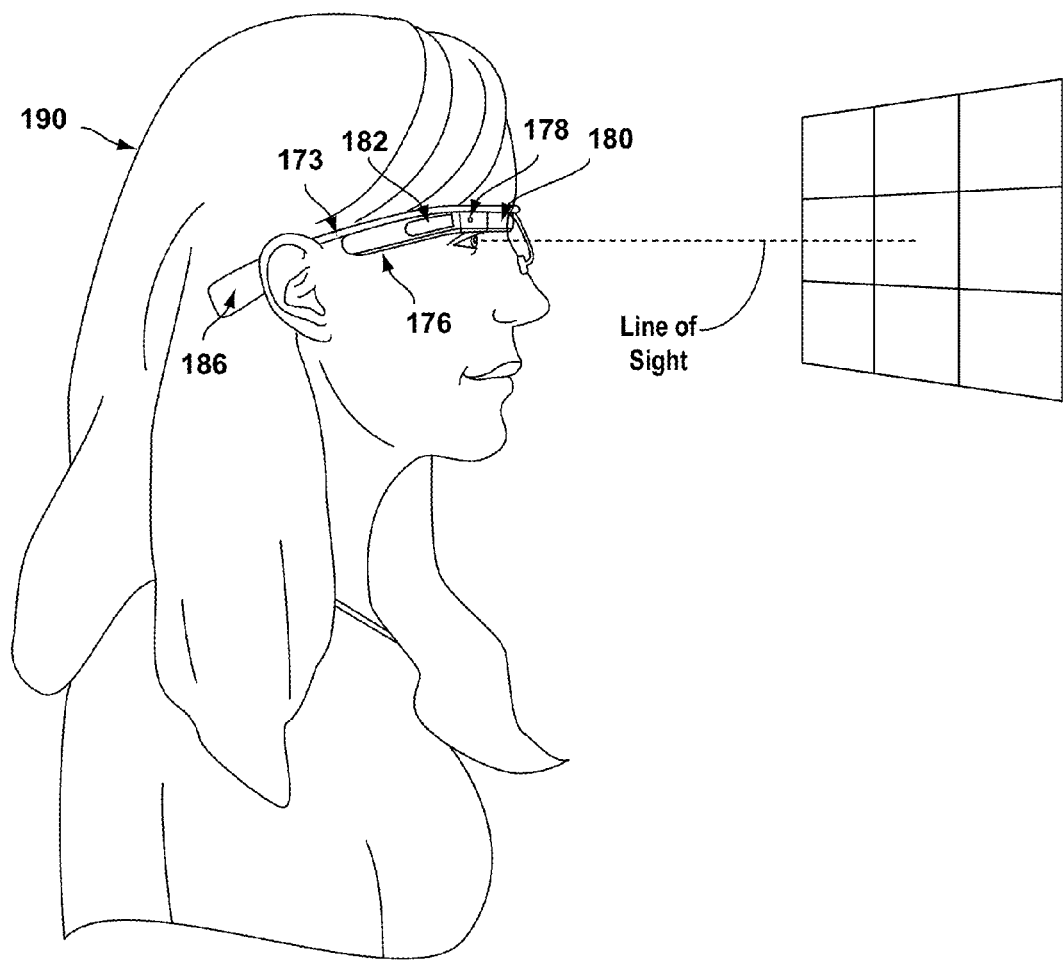
Figure 1G:
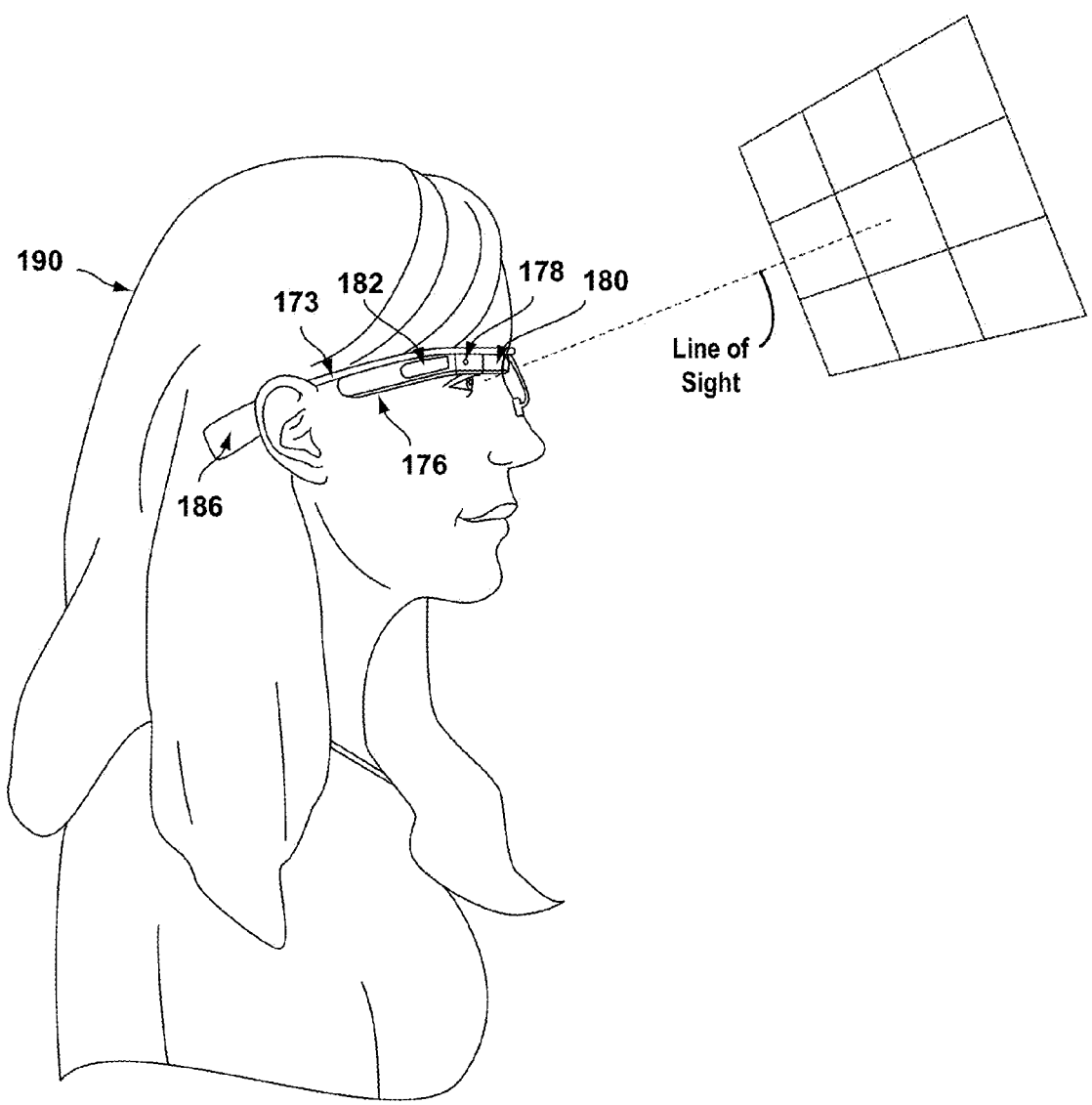

FIGS. 1E to 1G are simplified illustrations of the HMD 172 shown in FIG. 1D, being worn by a wearer 190. As shown in FIG. 1F, when HMD 172 is worn, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G, where the wearer has moved their eyes to look up and align their line of sight with display 180. A wearer might also use the display by tilting their head down and aligning their eye with the display 180.

Figure 2A:
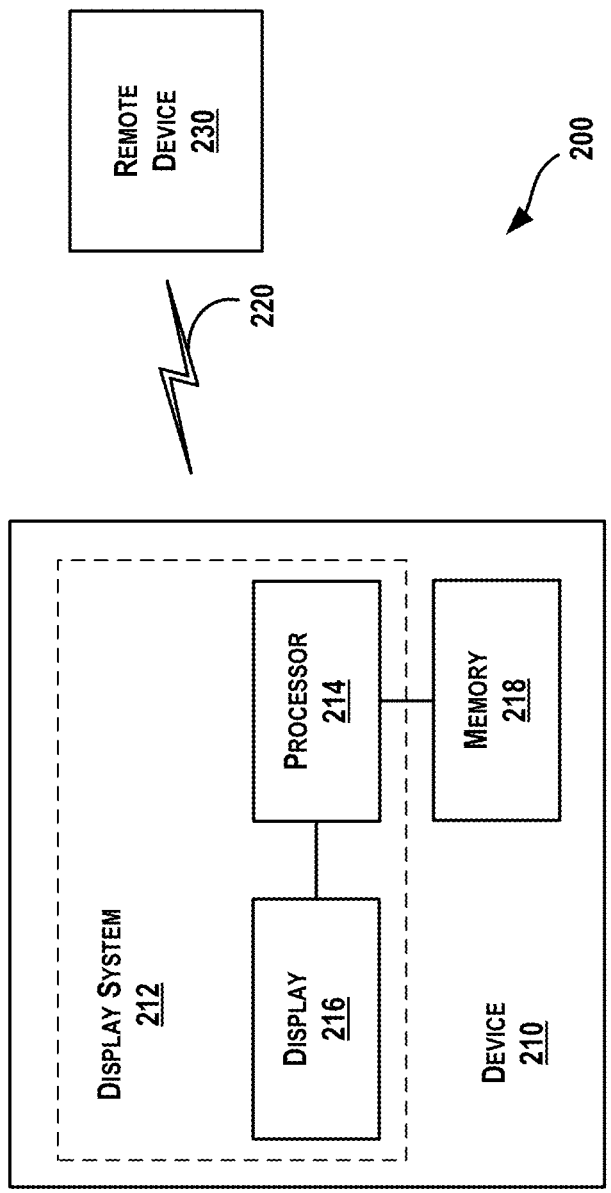
FIG. 2A illustrates a schematic drawing of a computing device according to an example embodiment.

FIG. 2A illustrates a schematic drawing of a computing device 210 according to an example embodiment. In an example embodiment, device 210 communicates using a communication link 220 (e.g., a wired or wireless connection) to a remote device 230. The device 210 may be any type of device that can receive data and display information corresponding to or associated with the data. For example, the device 210 may be a heads-up display system, such as the head-mounted devices 102, 152, or 172 described with reference to FIGS. 1A to 1G.

Thus, the device 210 may include a display system 212 comprising a processor 214 and a display 216. The display 210 may be, for example, an optical see-through display, an optical see-around display, or a video see-through display. The processor 214 may receive data from the remote device 230, and configure the data for display on the display 216.

The processor 214 may be any type of processor, such as a micro-processor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, or tablet computing device, etc., that is configured to transmit data to the device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of client device, such as computing device 210. Such a remote device 230 may receive data from another computing device 210 (e.g., an HMD 102, 152, or 172 or a mobile phone), perform certain processing functions on behalf of the device 210, and then send the resulting data back to device 210. This functionality may be referred to as "cloud" computing.

In FIG. 2A, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.)

C. Example Coordinate Systems

Figure 2B:
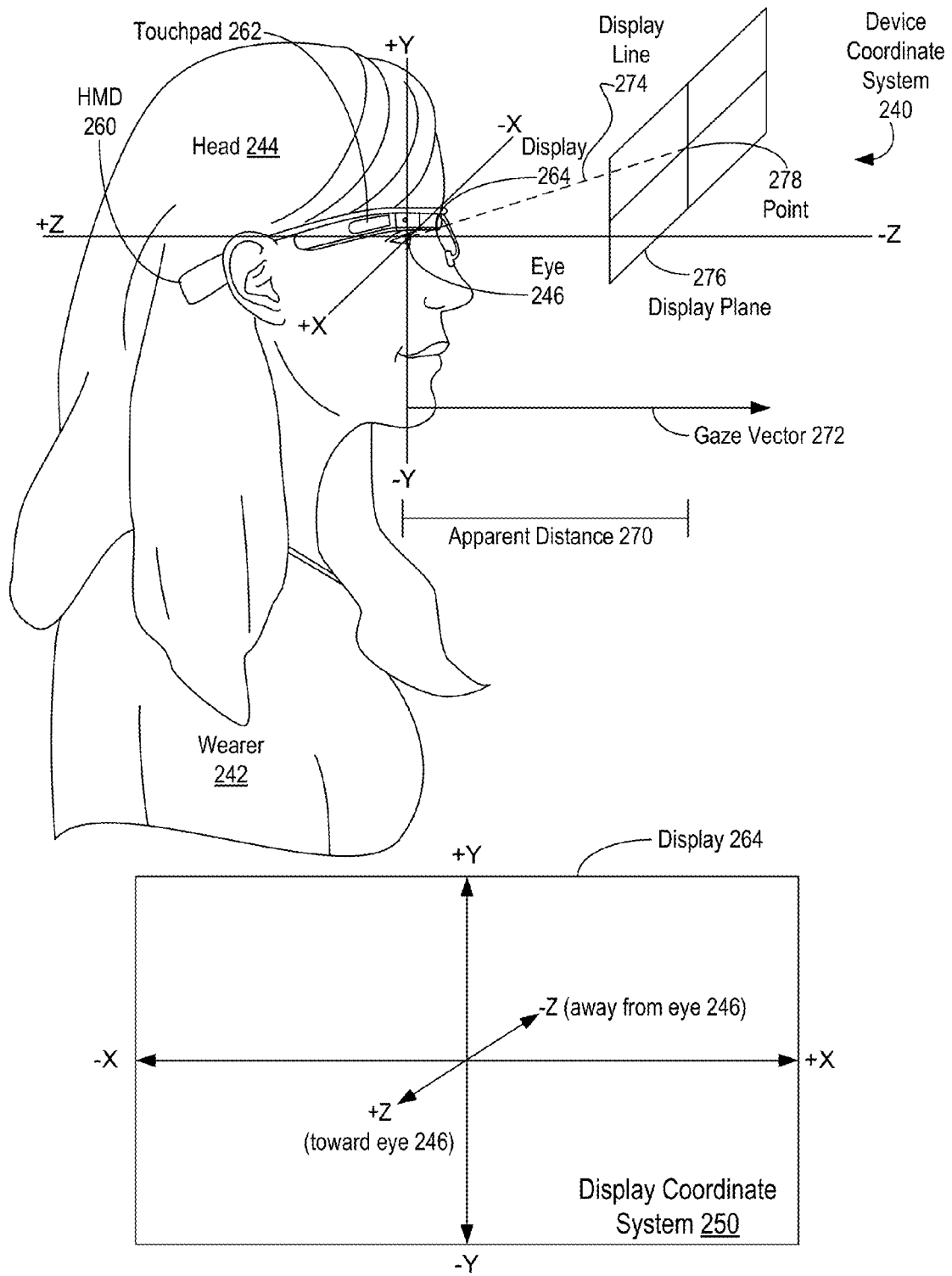
FIG. 2B shows an example device coordinate system and an example display coordinate system according to an example embodiment.

FIG. 2B shows an example device coordinate system 240 and corresponding display coordinate system 250 for a computing device such as HMD 260, in accordance with an embodiment. HMD 260 can be a head mountable device such as described above as HMD 172 and/or another herein-described HMD.

The device coordinate system 250 is used herein: when HMD 260 is level and upright on head 244 of wearer 242 with display 264 facing eye 246 of wearer 242, as shown in FIG. 2B, +X is right, +Y is up, and +Z is towards eye 246 (with respect to display 264) such that forward is −Z. In Figures showing the YZ plane, +X is toward the reader and −X is away from the reader in device coordinates. In terms of device coordinates, a swipe toward (sometimes termed swipe backward or swipe left) can involve a swipe, or movement by one or more fingers touching the touchpad, in the +Z direction. In device coordinates, a swipe away (sometimes termed swipe forward or swipe right) can involve swiping in the −Z direction.

Device coordinate system 240 can be used to specify a coordinate system for images shown in eye 246 of wearer 242 using display 264. FIG. 2B shows display coordinate system 250 for displaying images using display 264 as viewed by wearer 242. As shown in FIG. 2B, when HMD 260 is level and upright on head 244 with display 264 facing eye 246, +X in device coordinate system 250 is right along display 264, +Y in device coordinate system 250 is up with respect to display 264, and +Z in display coordinate system 250 is towards eye 246. For example, for fixed X and Y components in display coordinate system 250 objects shown on display 264 with a Z component of Z1 can appear to be larger to wearer 242 than objects having a Z component of Z2, where Z1>Z2. That is, as Z coordinates increase in display coordinate system 260, image displayed in display 264 using display coordinate system 250 appear increasingly larger up to the limits of display 264. In some embodiments, a two-dimensional display system can use coordinates of display coordinate system with a fixed Z component; e.g., Z=0. Unless specifically stated otherwise, X, Y, and Z components are specified below using display coordinate system 250.

HMD 260 can project an image in display plane 276 for view by wearer 242 at some apparent distance 270 along display line 274. For example, apparent distance 270 can be 1 meter, four feet, infinity, or some other distance. Display line 274 can be based on gaze vector 272. Gaze vector 272 tracks wearer 254's gaze, or direction of viewing. In FIG. 2B, wearer 242 is looking directly in the −Z direction, and thus gaze vector 272 is a vector along the −Z axis. For the sake of viewability, FIG. 2B shows gaze vector 272 below eye 246.

In an example shown in FIG. 2B, display line 274 can be directed to be above and to the right of gaze vector 272. Then, an image can be projected at display plane 276 that is perpendicular to display line 274 and includes at least point 278 where display line 274 is at apparent distance 270 from wearer 242. The image can be displayed in display plane 276 projected above and to the right of gaze vector 272; e.g., the image can be displayed as centered at point 278. Then, wearer 242 can look at a person or object along gaze vector 272 without the displayed image obscuring their gaze. In one example, the display element of the HMD 260 is translucent when not active (i.e. when an image is not being displayed), and so the wearer 242 can perceive objects in the real world along a vector corresponding to display line 274.

FIG. 2B shows that touchpad 262 is parallel, or at least substantially parallel, to display line 274, and thus is perpendicular, or at least substantially perpendicular to display plane 276. As such, touchpad 262 is at least substantially perpendicular to an image displayed in display plane 276. In some scenarios, touchpad 262 can be perpendicular to display plane 276 and so be perpendicular to an image displayed by display 264 in display plane 276. In other scenarios, touchpad 262 can be substantially, but not exactly, perpendicular to display plane 276 depending on a shape of a face of wearer 242, an exact angle that wearer 242 wears HMD 260 at any specific time, a specific configuration of HMD 260, and for other reasons that would cause touchpad 262 to vary from being perpendicular to an image displayed by display 264 in display plane 276. In very particular embodiments, touchpad 262 is substantially perpendicular to an image displayed by display 264 if a line from touchpad 262 to a plane of the image, e.g., display plane 276 is within 10 degrees of being perpendicular to the plane of the image.

D. An Example User Interface for a Computing Device

FIGS. 3A through 9 collectively describe aspects of an example user interface for a computing device, such as an HMD such as discussed above at least in the context of FIGS. 1A through 2B. The computing device can be configured with a UI controller receiving inputs from at least a touch-based UI. The touch-based UI can include one or more hand-movement input devices that are configured to receive various hand movements, such as one-finger swipes in various directions, two-finger or multi-finger swipes in various directions, taps, button presses of various durations, and button releases, and generate corresponding hand-movement data. In some embodiments, the one or more hand-movement input devices can be one or more of the hand-movement input devices discussed above in the context of FIG. 1A. In particular embodiments, the one or more hand-movement input devices can include a touchpad, such as touchpad 124, and a button. In some embodiments, the computing device can utilize a voice-based UI as well.

Once a touch is received, the touch-based UI can report the touch; e.g., a "swipe forward" or "tap" to the computing device, or in some cases, to a component of the computing device such as a UI controller. In other embodiments, the HMD can act as the UI controller. As described herein, the computing device includes any necessary components, such as but not limited to one or more UI controllers, which are configured to perform and control the UI operations described herein.

Figure 3A:
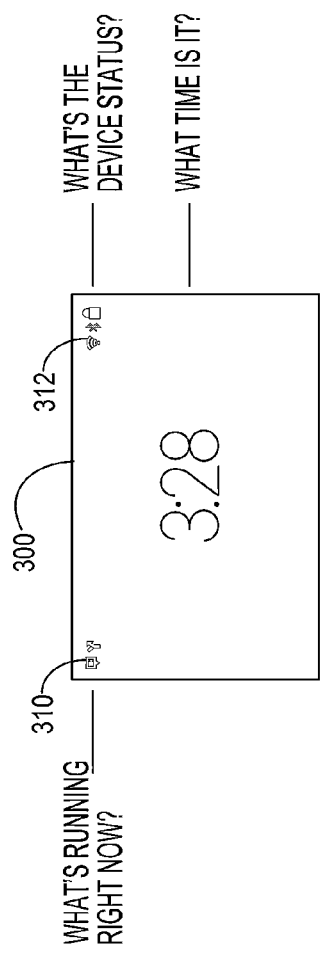
FIG. 3A shows an example home card of an example user interface for a HMD, according to an example embodiment.

The computing device can generate cards that can occupy the full display of the computing device when selected. One card is a home card that is the first card displayed when UI is activated, for example shortly after computing device powers up or when the computing device wakes from a sleep or power-saving mode. FIG. 3A shows an example home card 300 of an example user interface, according to an example embodiment. Home card 300 includes application status indicators 310, device status indicators 312, hint 316 and a clock shown in large numerals indicating the current time in the center of home card 300. Application status indicators 310 can indicate which application(s) are operating on the computing device. As shown in FIG. 3A, application status indicators 310 include camera and Y-shaped road icons to respectively indicate operation of a camera application and a navigation application. Such indicators can remind the wearer what applications or processes are presently running and/or consuming power and/or processor resources of the computing device.

Device status indicators 312 can indicate which device(s) are operating on the computing device and status for an HMD acting as the computing device. As shown in FIG. 3A, device status indicators 312 include icons for a wireless network and a Bluetooth network, respectively, that indicate the HMD is presently configured for communication via a wireless network and/or a Bluetooth network. In one embodiment, the HMD may not present device status indicators 312 on home card 300.

Figure 3B:
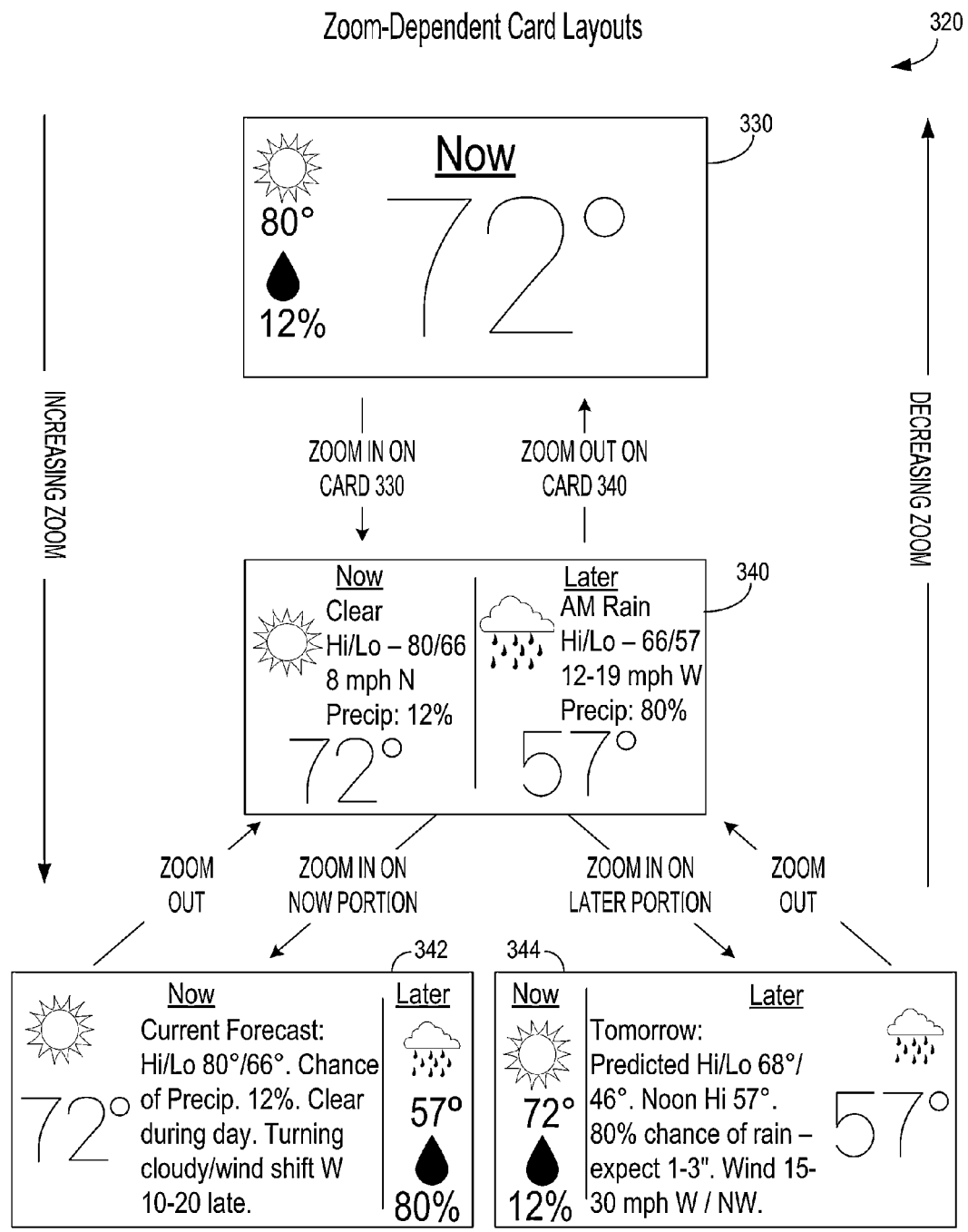
FIG. 3B shows an example scenario using different card layouts based on zoom levels, according to an example embodiment.

FIG. 3B shows a scenario 320 using different card layouts based on zoom levels, according to an example embodiment. Scenario 320 begins with the HMD displaying single card 330. Card 330 represents a current status of weather, as indicated by the word "Now" at the top of card 330. Card 330 also displays a current temperature of "72°", an icon of a sun to indicate sunny/clear skies, a predicted high temperature of "80°", and an indication of a "12%" chance for precipitation.

Scenario 320 continues with a wearer, such as wearer 242, of the HMD performing a clutch operation discussed below in the context of FIG. 4, or other similar operation, to place at least two fingers on a touchpad of an HMD, such as touchpad 262 of HMD 260. To simulate Z axis operations or "zooms", increasing the size of card 330 or "zooming in" can simulate bringing the object closer in the Z dimension, while decreasing the size of card 330 or "zooming out" can simulate moving away from the object in the Z dimension.

Zoom in and zoom out operations can be performed using two-finger swipes. For example, a two-finger swipe away can lead to a zoom out operation; that is, decreasing the Z coordinate and showing less detail in card 330. A two-finger swipe towards can lead to a zoom in operation; that is; increasing the Z coordinate and showing more detail in card 330. For example, while displaying card 340, a two-finger swipe away can lead to the HMD displaying card 330, and a two-finger swipe away can lead to displaying card 342 or 344. In some scenarios not shown in FIG. 3B, multiple cards can be shown at one time—in these scenarios, zooming in on multiple cards can lead to fewer or even one card of the multiple cards being displayed, while zooming out on multiple cards can lead to additional cards being displayed.

Scenario 320 continues with the wearer performing one or more two-finger swipe toward operations to zoom in on card 330. In response to the two-finger swipe toward operation(s), the HMD can display card 330 with a different card layout, such as a layout of card 340 shown in FIG. 3B, that enables display of additional detail not enabled by a layout of card 330. For example, a portion of card 340 for "Now" includes additional information about the current forecast than shown in card 330, including "Hi/Lo" temperature information, and current windspeed of "8 mph N". Card 340 also includes a portion that shows information about a "Later" period that is not displayed on card 330. FIG. 3B shows that the "Later" portion of card 340 has a weather forecast including "AM Rain", Hi/Lo temperature information, and wind/precipitation predictions for the "Later" period.

In some embodiments, a portion of a card can be focused on. For example, the HMD can use head movements, such as head movements 740 discussed below in the context of FIG. 7A, to perform X axis and Y axis navigation while displaying a card e.g., head movements 740 can be used to move up, down, left, and right within a single-card display.

In these embodiments, different layouts can be utilized for different zoomed-in portions of a card. In scenario 320, while card 340 is displayed, the wearer of the HMD can zoom in on the "Now" portion of card 340. In response, the HMD can display card 342 that provides additional information about the current weather forecast, and provides some information about the "Later" weather. After reviewing card 342, the wearer can zoom out to cause card 340 to be displayed, and change focus to the "Later" portion of card 340. In response to zooming in on the later portion of card 340, the HMD can display card 344 that provides additional information about the "Later" weather forecast of "Tomorrow's" weather, and provides some information about the weather "Now". In scenario 320, after reviewing card 344, the wearer can zoom out to instruct the HMD to display card 340, and zoom out further to instruct the HMD to display card 330 to end scenario 320.

In other examples, additional kinds of information and layouts can be used than shown in FIG. 3B. For example, for a card related to an audio recording of a song or group of songs (e.g., an album), zooming in on the card can provide more information about the song; e.g., date of release, song publisher, etc. Similarly, additional information, when available, can be provided upon zooming in on cards related to videos, still images, messages, and other types of information. In still other examples, additional information can be provided and different layouts used when zooming in and zooming out on multi-card views.

The UI can accept as inputs certain UI operations performed using the touch-based UI. The UI can receive these UI operations and responsively perform actions to enable the wearer to interact with the computing device. These UI operations can be organized into tiers. FIG. 4 lists example UI operations in multi-tiered user model 400 for the computing device, according to an example embodiment.

As shown in FIG. 4, multi-tiered user model 400 has three tiers: basic, intermediate, and advanced. The basic tier provides the smallest number of UI operations of any tier of multi-tiered user model 400. The intermediate tier includes all UI operations provided by the basic tier, along with additional operations not provided by the basic tier. Similarly, the advanced tier includes all UI operations provided by the basic and intermediate tiers, along with additional operations not provided by either the basic tier or intermediate tier.

FIG. 4 shows that the basic tier of multi-tiered user model 400 provides tap, swipe forward, swipe backward, voice, and camera button press operations. A tap operation can involve a single physical tap—that is, one quick, slight strike with one or more fingers on a touchpad of the touch-based UI. A swipe forward operation, sometimes termed a swipe away or a swipe right, can involve a swipe in the general −Z direction; e.g., the direction from the wearer's ear toward the wearer's eye when the wearer has an HMD acting as the computing device on. A swipe backward operation, sometimes termed a swipe left or swipe toward, can involve in the general +Z direction; e.g., the direction from the wearer's eye toward the wearer's ear when the wearer has the HMD on. A swipe down operation can involve a downward swipe, where downward is the general direction from the top of the wearer's head toward the wearer's neck when the wearer has the HMD on; e.g., the −Y direction in device coordinate system 250.

While example embodiments in this description make reference to particular directions of touchpad input such as up, down, left, right, it should be understood that these are exemplary and that embodiments where certain operations may be triggered via different input directions are contemplated.

In one embodiment, the physical actions used by the wearer to perform some or all of the herein-described operations can be customized; e.g., by the wearer and/or other entity associated with the HMD. For example, suppose the wearer prefers to perform a physical action of a double-tap—that is, one physical tap quickly followed by a second physical tap—rather than the above-mentioned single physical tap, to perform a tap operation. In this embodiment, the wearer and/or other entity could configure the HMD to recognize a double-tap as a tap operation, such as by training or setting the HMD to associate the double-tap with the tap operation. As another example, suppose that the wearer would like to interchange the physical operations to perform swipe forward and backward operations; e.g., the swipe away operation would be performed using a physical action described above as a swipe left and the swipe toward operation would be performed using a physical action described above as a swipe right. In this embodiment, the wearer could configure the HMD to recognize a physical swipe left as a swipe away operation and physical swipe right as a swipe toward operation. Other customizations are possible as well; e.g., using a sequence of swipes to carry out the tap operation.

The tap operation can select a currently visible card. The swipe away operation can remove the currently visible card from display and select a next card for display. The swipe toward operation can remove the currently visible card from display and select a previous card for display. In other contexts, such as in the context of a Z-axis oriented display, a swipe toward and a swipe away can have different effects, such as, respectively zooming in or zooming out on an image or timeline, increasing or decreasing a settings value, or respectively causing a message to be answered or rejected.

The swipe down operation can, depending on context, act to go back, go home, or sleep. Going back can remove the currently visible card from display and display a previously-visible card for display. For example, the previously-visible card can be the card that was most recently prior currently visible card; e.g. if card A is currently visible and card B is the recently prior currently visible card, then the swipe down operation can remove card A from visibility and display card B. Going home can replace the currently visible card from display and display the home card. Sleeping can cause part; e.g., the display, or all of the HMD to be deactivated.

In some embodiments, a voice operation can provide access to a voice menu of operations. In other embodiments, a camera button press can instruct the HMD to take a photo using a camera associated with and/or part of the HMD.

FIG. 4 shows that the intermediate tier of multi-tiered user model 400 provides tap, swipe forward, swipe backward, voice, and camera button press operations as described above in the context of the basic tier. Also, the intermediate tier provides camera button long press, two finger swipe forward, two finger swipe backward, and two finger swipe down operations.

The camera button long press operation can instruct the HMD to provide a capture menu for display and use. The capture menu can provide one or more operations for using the camera associated with HMD.

In some embodiments, Z-axis oriented movement within an HMD display can be performed by a wearer can swipe toward, swipe away, swipe up, using two fingers on the touchpad of the HMD. For example, a two-finger swipe forward (swipe away) can be interpreted as moving away or decreasing a Z-axis coordinate, and a two-finger swipe backward (swipe toward) can be interpreted as moving toward or increasing the Z-axis coordinate. In some scenarios, a two-finger swipe backward can be used to zoom in on one or more cards and a two-finger swipe forward can be used to zoom out from one or more cards.

The two finger swipe down can cause the HMD to sleep. In some embodiments, the two finger swipe down can save the current position in the timeline for recall and redisplay upon awakening the HMD.

FIG. 4 shows that the advanced tier of multi-tiered user model 400 provides tap, swipe forward, swipe backward, voice, and camera button press operations as described above in the context of the basic tier, as well as camera button long press, two finger swipe forward, two finger swipe backward, and two finger swipe down operations described above in the context of the intermediate tier. The advanced tier also provides one-finger press-and-hold, two-finger press-and-hold, and nudge operations.

The two-finger press-and-hold can provide a "clutch" operation, which can be performed by pressing on the touch-based UI in two separate spots using two fingers and holding the fingers in their respective positions on the touch-based UI. After the fingers are held in position on the touch-based UI, the clutch operation is engaged. In some embodiments, the HMD recognizes the clutch operation only after the fingers are held for at least a threshold period of time; e.g., one second. The clutch operation will stay engaged as long as the two fingers remain on the touch based UI.

The nudge operation can be performed using a short, slight nod of the wearer's head. For example, the HMD can be configured with accelerometers or other motion detectors that can detect the nudge and provide an indication of the nudge to the HMD. Upon receiving indication of a nudge, the HMD can toggle an activation state of the HMD. That is, if the HMD is active (e.g., displaying a card on the activated display) before the nudge, the HMD can deactivate itself (e.g., turn off the display) in response. Alternatively, if the HMD is inactive before the nudge but is active enough to detect nudges; e.g., within two or a few seconds of notification of message arrival, the HMD can activate itself in response.

By way of further example, in one scenario, the HMD is powered on with the display inactive. In response to the HMD receiving a new text message, an audible chime can be emitted by the HMD. Then, if the wearer nudges within a few seconds of the chime, the HMD can activate and present a card or a Z-axis oriented display with the content of the text message. If, from the activated state, if the user nudges again, the display will deactivate. Thus, in this example, the user can interact with the device in a completely hands-free manner.

As mentioned above, the UI maintains a timeline or ordered sequence of cards that can be operated on using the operations described in FIG. 4 immediately above. FIG. 5 shows a scenario 500 of example interactions with a single timeline of cards, according to an example embodiment.

Scenario 500 begins with home card 502 being displayed by an HMD acting as a computing device and worn by a wearer; e.g., HMD 260 worn by wearer 242. Home card 502 and cards 520a-520c can be arranged as a "timeline" or sequence of cards ordered based on time. FIG. 5A shows that cards 520a-520c are arranged along the X-axis of device coordinate system 250. In the example shown in FIG. 5A, each card in timeline 510 has a specific time associated with the card.

Timeline 510 can be ordered along the X-axis based on the specific times associated with the cards in the timeline. In some cases, the specific time can be "now" or the current time. For example, home card 502 can be associated with the specific time of now. In other cases, the time can be a time associated with an event leading to the card. For example, FIG. 5A shows that card 520a represents a photo taken at a time 2 hours ago. Then, card 520a can be associated with the specific time of 1:28, which is 2 hours before the current time of 3:28 shown on home card 502. As the specific time of card 520a is less than now, the time associated with home card 502, card 520a is shown having a smaller X component in device coordinate system 250 than home card 502.

Cards 520b-520f represent current cards, or cards associated with the specific time of now, or upcoming cards, or cards associated with a future time. For example, card 520b is a current card that includes an image currently generated by a camera associated with the HMD, card 520c is a current card that includes an image of a "hangout" or video conference call currently in-progress generated by an application of the HMD, card 520d is a current card that includes an image and text currently generated by a navigation application/process presently running on the HMD, card 520e is a current card that includes images and text currently generated by a weather application of the HMD, and 520f is an upcoming card that includes images and text generated by a calendar application of the HMD indicating an appointment for "Lunch with Monica Kim" in "2 hours".

In some embodiments, home card 502 can be the left-most card along timeline 510 associated with the time of now; i.e., home card 502 can have the smallest X component for all cards associated with the time of now. Then, cards 520b-520f, each of which are associated with either a time of now or a later time, can have a larger X component in device coordinate system 250 than home card 502.

In scenario 500, the HMD can enable navigation of time line 520 using swipe operations. For example, starting at home card 502, a swipe backward operation can cause the HMD to select and display a previous card, such as card 520a, and a swipe forward operation the HMD to select and display a next card, such as card 520b. Upon displaying card 520b, the swipe forward operation can cause the HMD to select and display the previous card, which is home card 502, and the swipe backward operation can cause the HMD to select and display the next card, which is card 520c.

In scenario 500, there are no cards in timeline 510 that are previous to card 520a. In one embodiment, the timeline is represented as circular. For example, in response to a swipe backward operation on card 520a requesting a previous card for display, the HMD can select 520f for (re)display, as there are no cards in timeline 510 that are after card 520f during scenario 500. Similarly, in response to a swipe forward operation on card 520f requesting a next card for display, the HMD can select 520a for (re)display, as there are no cards in timeline 510 that are after card 520f during scenario 500.

In another embodiment, instead of a circular representation of the timeline, when the user navigates to the end of the timeline, a notification is generated to indicate to the user that there are no additional cards to navigate to in the instructed direction. Examples of such notifications could include any of or a combination of any of a visual effect, an audible effect, a glowing effect on the edge of the card, a three dimensional animation twisting the edge of the card, a sound (e.g. a click), a textual or audible message indicating that the end of the timeline has been reached (e.g. "there are no cards older than this"). Alternatively, in one embodiment, an attempt by the user to navigate past a card in a direction where there are no additional cards could result in no effect, i.e. swiping right on card 520a results in no perceptible change to the display or card 520a.

As one card is displayed at a time in scenario 500, the HMD can be considered as presenting a single-card view of timeline 510 to the wearer of the HMD where the displayed card occupies substantially all of the viewing area provide by the HMD. As all cards in timeline 510 are arrayed along a single axis or dimension, the single-card view of timeline 510 can be considered as a 1D view of a timeline. In some embodiments discussed below, multiple cards of a timeline, such as timeline 510 can be displayed simultaneously. In those embodiments, 1D view of the timeline can also include the multiple cards of the timeline arrayed along a single axis, such as timeline 510 shown in FIG. 5 arrayed along the X axis.

Figure 6:
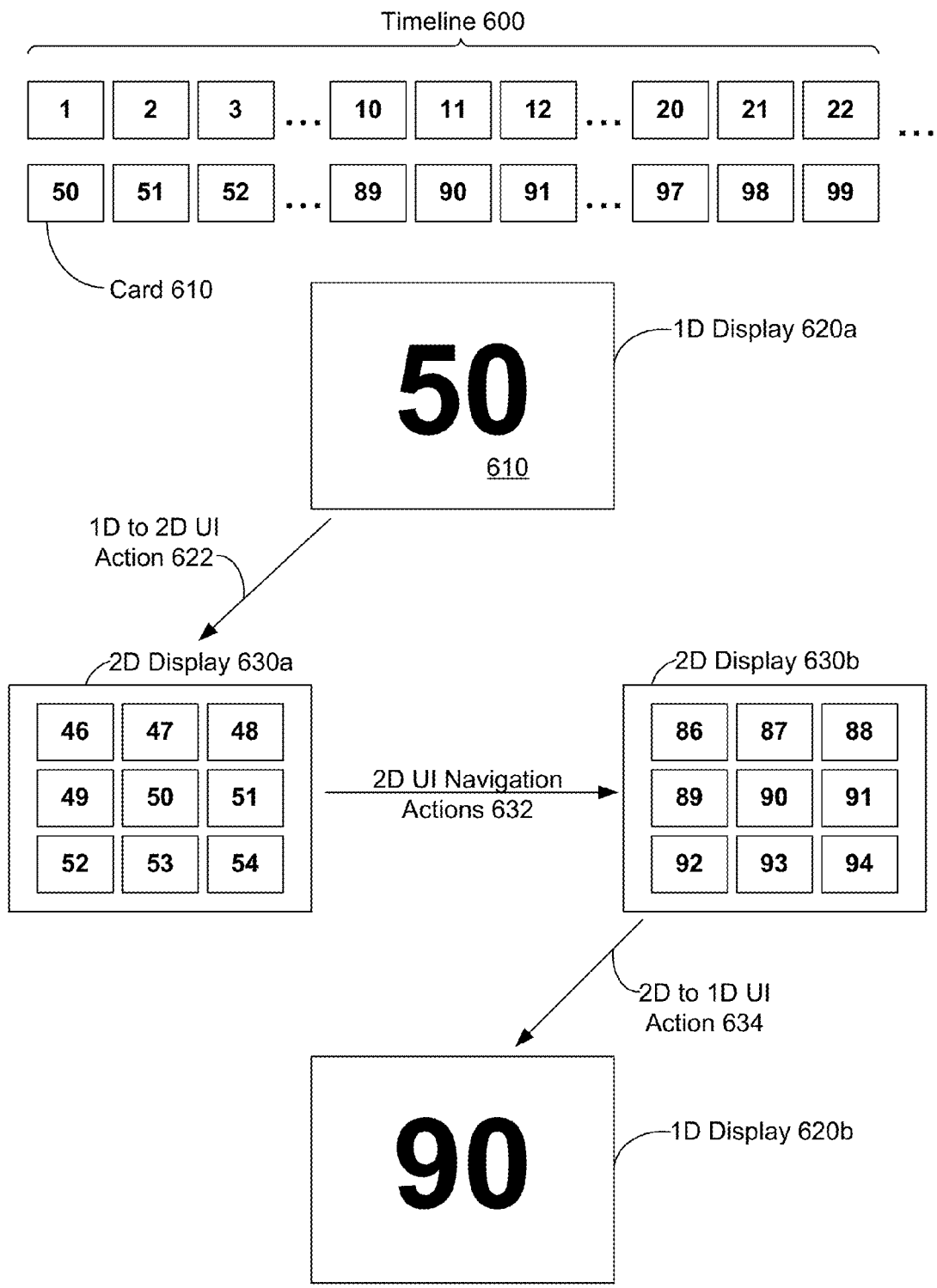
FIG. 6 shows an example scenario sing one-dimensional (1D) and two-dimensional (2D) displays to view a timeline of cards, according to an example embodiment.

FIG. 6 shows an example scenario using one-dimensional (1D) and two-dimensional (2D) displays to view timeline 600 of cards, according to an example embodiment. Timeline 600 is shown in FIG. 6 including 99 cards ordered in numerical order, including cards numbered 1, 2, 3, . . . 10, 11, 12, . . . 20, 21, 22, . . . 50, 51, 52, . . . 89, 90, 91, . . . 97, 98, and 99 Of the cards in timeline 600, card 610 is a card numbered "50". Single-card display 620a of FIG. 6 shows card 610 of timeline 600. While in display 620a, card 610 can be considered as a "focused-on" card for purposes of performing operations on the card, such as but not limited to user interface actions, sharing operations, focusing on/zooming operations, and operations for reviewing, updating, deleting, and inserting cards. In one embodiment not shown in FIG. 6, the HMD can provide a 1D display of multiple cards from a timeline, such as a row or column of cards.

A user of the computing device can provide a 1D to two-dimensional (2D) user interface (UI) action, such a clutch operation discussed below, to request switching from a 1D display, such as display 620a of timeline 600, to a 2D display of timeline 600. An example 2D display of timeline 600 is shown as a grid view of cards in 2D display 630a. 2D display 630a shows nine cards simultaneously using a 3×3 grid of cards, along both X and Y axes or dimensions.

Navigation, or movement within the grid view of timeline 600, can be performed using 2D UI navigation actions 632, such as the head movements 740 discussed below in more detail in the context of FIG. 7A. In the example scenario shown in FIG. 6, a result of navigation actions 632 is 2D display 630b displaying card associated with numbers "86" through "94" inclusive.

To return to a 1D display of timeline 600, a 2D to 1D UI action 634, such as ending the aforementioned clutch operation, can be performed. As a result, a focused on and/or centered card of the 2D display can be focused on and/or display in the 1D display. For example, as a "90" card was centered in 2D display 630b when 2D to 1D UI action 634 was performed, the "90" card can be displayed in a single-card view by 1D display 620b.

To speed movement in selecting next card(s) in the timeline, a wearer can swipe forward with two fingers to perform a "zoomed scroll" to a next card using a 1D display of a row of a timeline. Similarly, to speed movement in selecting previous card(s) in the timeline, a wearer can swipe backward with two fingers to perform a zoomed scroll to a previous card.

Additional techniques for rapid movement within a timeline and between timelines can be provided by the UI. For example, a clutch operation, or touching a touchpad, touchscreen, or other interface associated with the computing device using at least two fingers simultaneously, can lead to generation and display of a grid-view display, such as shown in FIGS. 7A-C, or a multi-timeline display, such as shown in FIG. 8. Navigation within the multi-card display and/or multi-timeline display can, in some embodiments, be performed using head movements. In other embodiments, the multi-card display or multi-timeline display in toto can be focused on, or displayed by the HMD, and so to aid navigation, a sub-focus to highlight a card or timeline within a multi-card or multi-timeline display.

Figure 7A:
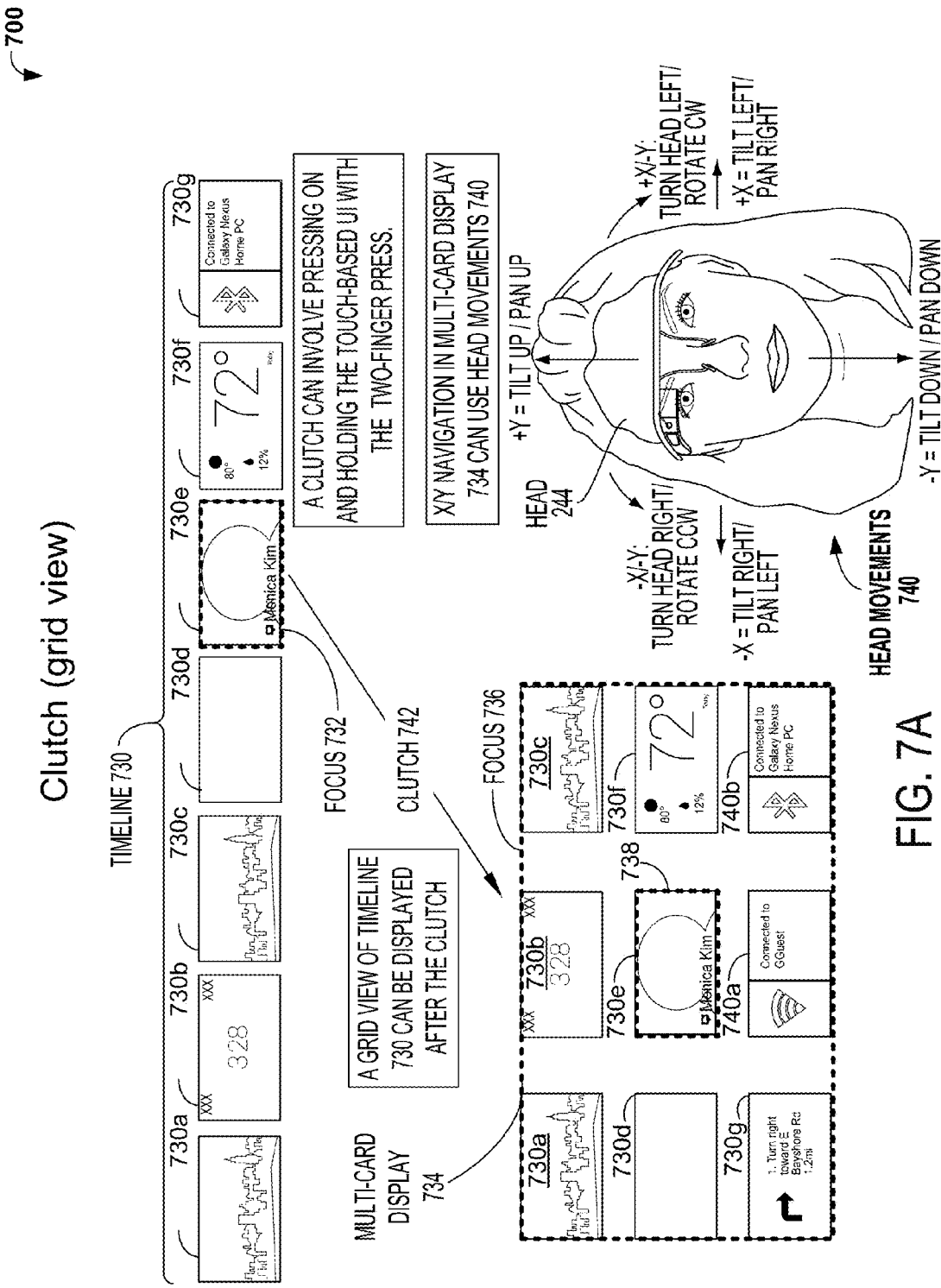
FIG. 7A shows a scenario for using a clutch operation to generate a grid view, according to an example embodiment.
Figure 7B:
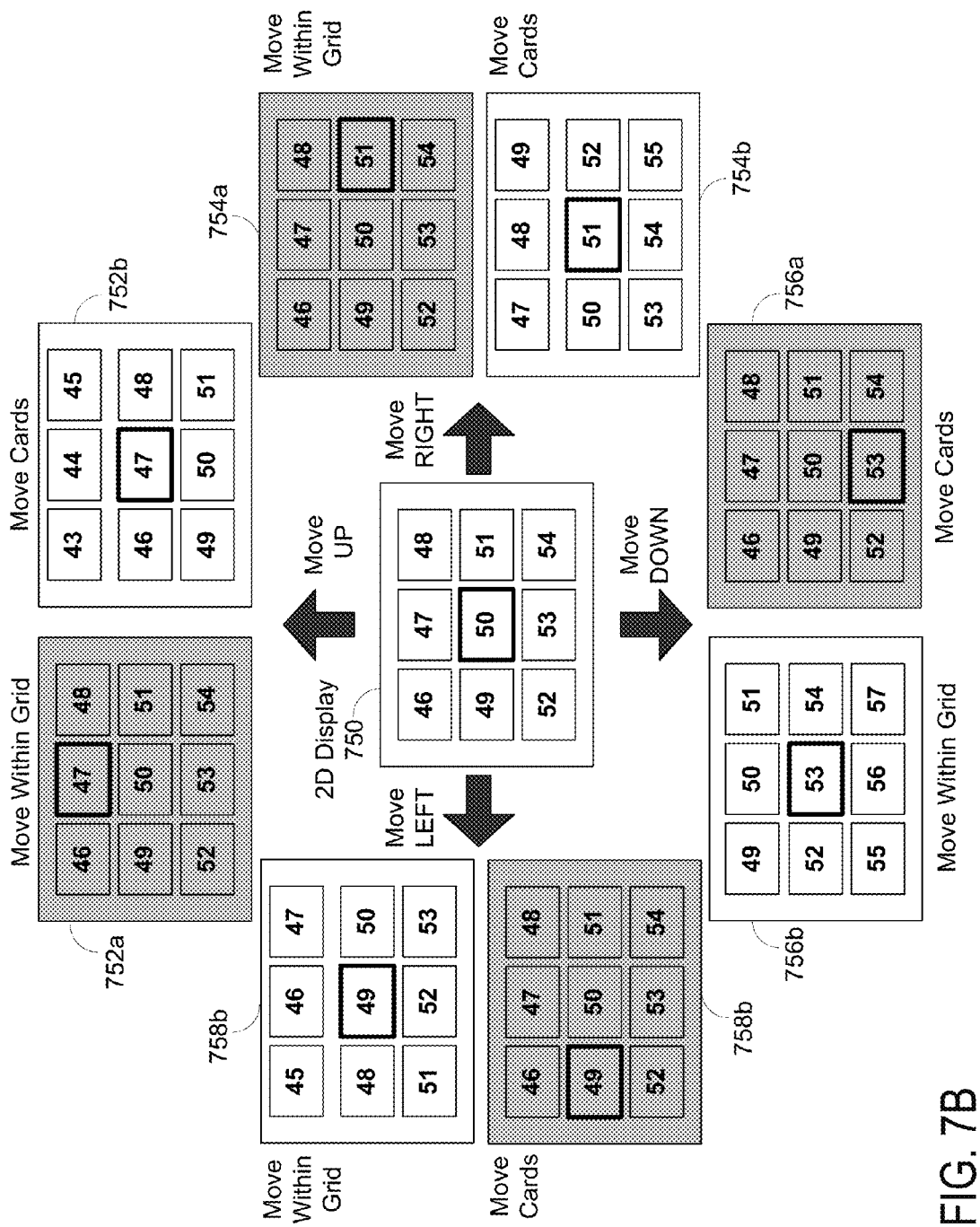
FIG. 7B shows example techniques for movement related to grid views, according to an example embodiment.
Figure 7C:
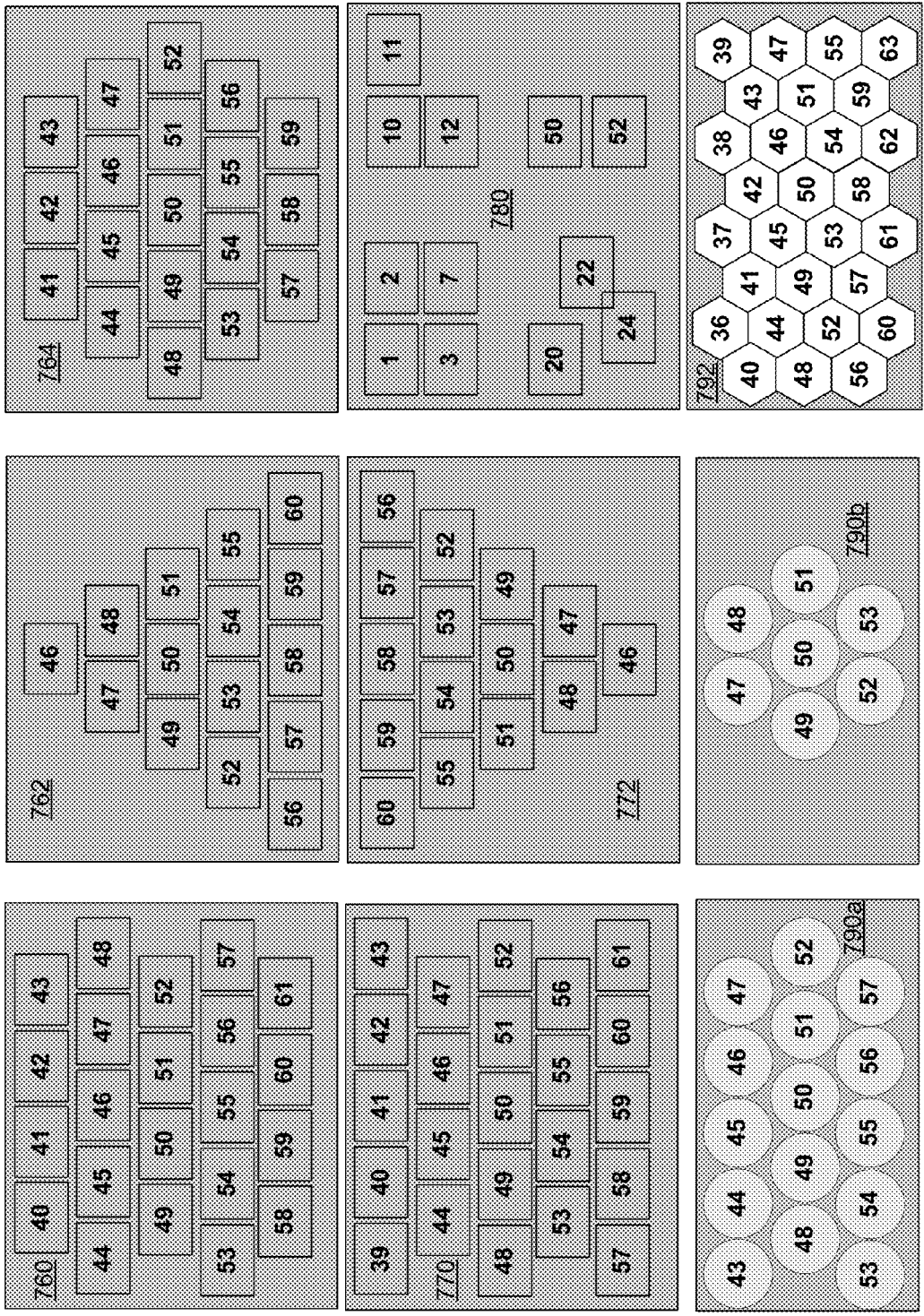
FIG. 7C shows example grid views, according to an example embodiment.
Figure 8:
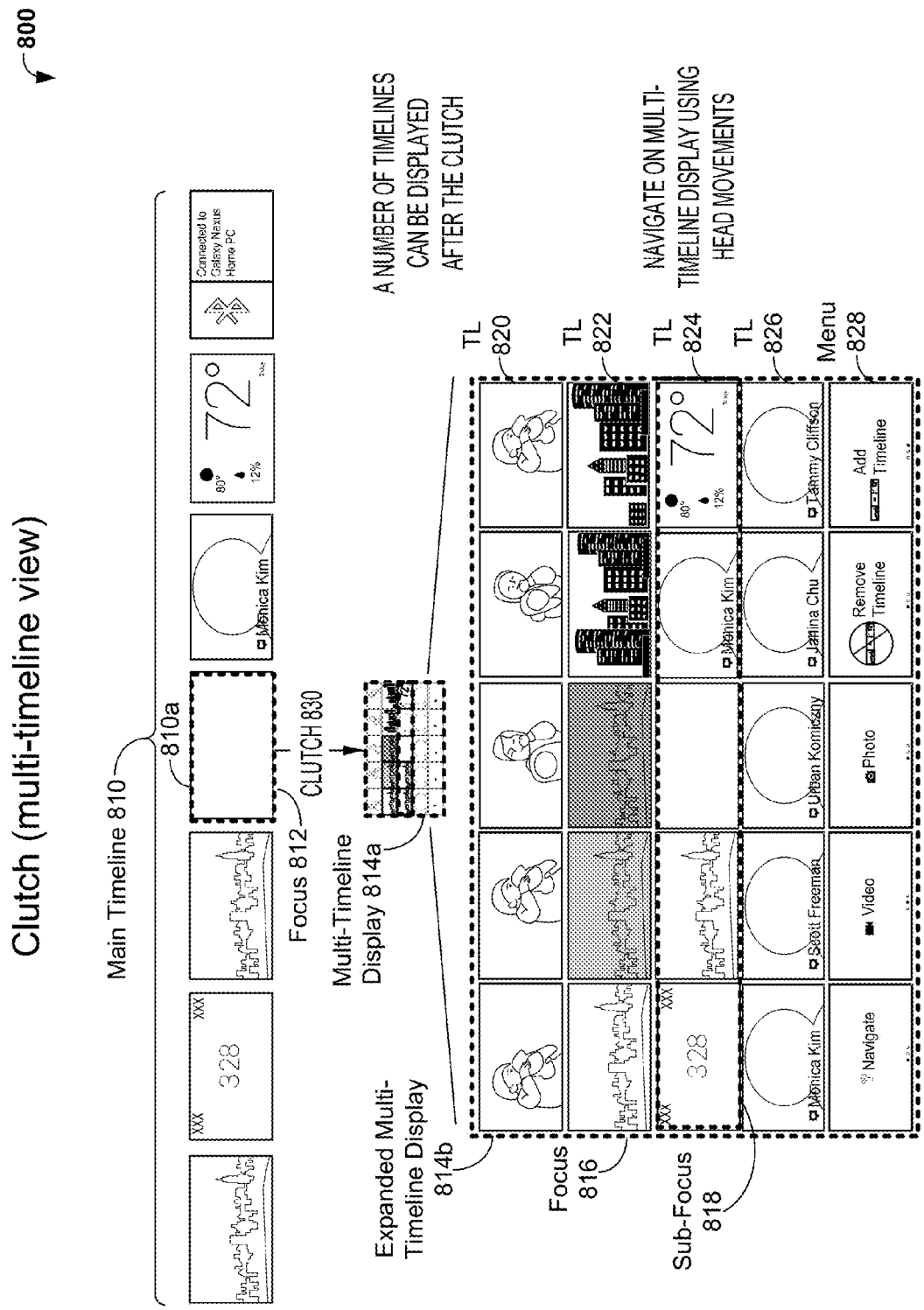
FIG. 8 shows a scenario for using a clutch operation to generate a multi-timeline view, according to an example embodiment.

FIG. 7A shows a scenario 700 for using clutch operation 742 to generate a multi-card display 734, according to an example embodiment. Scenario 700 begins with an HMD having timeline 730 with cards 730a through 730g, and with a focus on card 730d. During scenario 700 prior to clutch 742, the HMD displays cards in the timeline using a single-card view, while solely displays a focused-upon card. As the focus is on card 730d, which FIG. 7A shows as a photo of a woman's face, the HMD displays a single-card view of card 730d.

Scenario 700 continues with a wearer of the HMD performing clutch operation 742 using the touch-based UI of the HMD. A clutch operation can involve pressing on the touch-based UI of the HMD using two fingers and holding the two-finger press until the HMD recognizes the clutch operation 742 has been performed. Other gestures, techniques, inputs or time thresholds may be used to trigger the clutch operation. For example, in certain embodiments, a three-finger gesture or a voice-action could be used to engage and/or disengage the clutch operation.

Upon recognition of clutch operation 742, in scenario 700, the HMD can generate and display multi-card display 734. In some embodiments, the HMD can focus on the entire multi-card display 734 using focus 736. In other embodiments, the HMD can focus a subset of cards, such as but not limited to, a single card, a row of cards, a column of cards, a block of cards, or some other selection of cards, within multi-card display 734 using sub-focus 738. For example, in scenario 700, the HMD is configured to display sub-focus 738 on a single card. In some embodiments, the sub-focus can remain on one or more cards at or near the center of the display.

As shown in FIG. 7A using multi-card display 734, the multi-card display shows nine cards: cards 730a through 730g of timeline 730 and two other cards 740a and 740b not shown as part of timeline 730. Head movements 740 can be detected by an HMD; e.g., HMD 260, as movements of head 244 and then used to navigate around multi-card display 734. In some embodiments, gaze tracking can be used in place of or in addition to head movements for navigating around multi-card display 734 and/or multi-timeline display 814a, 814b.

For example, head movements 740 regarding Y-axis navigation can include a tilt up of head 244 of wearer 242 to increase a Y coordinate for multi-card display 734 and a tilt down of head 244 of wearer 242 to decrease the Y coordinate for multi-card display 734. Visually, increasing the Y coordinate appears as panning up in multi-card display 734 and decreasing the Y coordinate appears as panning down in multi-card display 734.

Regarding X-axis navigation of multi-card display 734, head movements 740 can include a tilt right of head 244 (from a wearer's point of view) to decrease the X coordinate for multi-card display 734 and a tilt left of head 244 (from a wearer's point of view) to increase the X coordinate for multi-card display 734. Visually, increasing the X coordinate appears as panning right in multi-card display 734 and decreasing the X coordinate appears as panning left in multi-card display 734.

In some scenarios, head movements 740 can include head motion(s) in both X and Y dimensions. For example, turning or rotating head 244 can generate a UI action related to rotation, such as rotating an image, card, or other display. FIG. 7A shows that turning head 244 down and to the right (from a wearer's point of view)—that is a head movement in both the —X and —Y directions—can lead to generation of a UI action related a counter-clockwise (CCW) rotation. FIG. 3B also shows that turning head 244 down and to the left (from a wearer's point of view)—that is a head movement in both the +X and −Y directions—can lead to generation of a UI action related a clockwise (CW) rotation.

As another example, movements in both X and Y dimensions can be interpreted as diagonally oriented movements; e.g., a movement in both the −X and −Y directions can be interpreted as a movement diagonally down-and-right; a movement in both the −X and +Y directions can be interpreted as a movement diagonally up-and-right; a movement in both the +X and −Y directions can be interpreted as a movement diagonally down-and-left; and a movement in both the +X and +Y directions can be interpreted as a movement diagonally up-and-left. Other examples are possible as well.

In scenario 700, "wrap-around" movements, or moving off the end of a row or column to the respective other end of the row or column, are enabled. Then, in response to respective movements upward, downward, leftward, or rightward by the head of the wearer, the sub-focus 738 can move from card 730d, as shown in FIG. 7A, to respective cards 730a, 730g, 730f, or 730g. In particular embodiments, wrap-around can be inhibited, so moving the wearer's head leftward will not move sub-focus 738 from card 730d to card 730f, but rather sub-focus 738 will stay at the left-end of the middle row on card 730d.

In some embodiments, in response to respective movements diagonally up-and-left, up-and-right, down-and-left, and down-and-right by the head of the wearer, the sub-focus 738 can move from card 730d, as shown in FIG. 7A, to respective cards 730c, 730b, 740b, or 740c. Other types of head movements and/or UI operations can be used as well or instead with multi-card display 734, including but not limited to head movements and/or UI operations that move the focus faster than and/or slower than one card at a time, zooming in and out, reshaping sub-focus 738, rotating card(s), selecting card(s), and deselecting card(s).

In some embodiments, sub-focus 738 may not be used. For example, in these embodiments, a leftward head movement may move each of cards 730b, 730c, 730e, 730f, 740a, and 740b to the left by one card, bring in new cards to the "right" of these cards (new cards not shown in FIG. 7A) on to multi-card display 734 to be displayed in the respective positions of card 730c, 730f, and 740b, and remove cards 730a, 730d, and 730g from view on multi-card display 734. Also, a rightward head movement may move each of cards 730a, 730b, 730d, 730e, 730g, 740a to the right by one card, bring in new cards to the "right" of these cards (not shown in FIG. 7A) on to multi-card display 734 to be displayed in the respective positions of card 730a, 730d, and 740g, and remove cards 730c, 730f, and 740b from view on multi-card display 734.

In these embodiments, an upward head movement may: (1) bring a new row of cards considered to be "above" the top row of cards; e.g., cards in the positions of cards 730a, 730b, 730c of multi-card display 734, (2) display the new row of cards on the top row of multi-card display 734, (3) move the top row of cards down to be displayed as the middle row of cards; e.g. display cards 730a, 730b, and 730c in the positions of cards 730d, 730e, and 730f of multi-card display 734, (4) move the middle row of cards down to the bottom row of cards e.g. display cards 730d, 730e, and 730f in the positions of cards 730g, 740a, and 740b of multi-card display 734, thus removing the bottom row of cards; e.g., cards 730g, 740a, and 740b, from view on multi-card display 734.

In these embodiments, an downward head movement may: (1) bring a new row of cards considered to be "below" the bottom row of cards of multi-card display 734, (2) display the new row of cards on the bottom row of multi-card display 734, (3) move the bottom row of cards up to be displayed as the middle row of cards; e.g. display cards 730g, 740a, and 740b in the positions of cards 730d, 730e, and 730f of multi-card display 734, (4) move the middle row of cards up to the top row of cards e.g. display cards 730d, 730e, and 730f in the positions of cards 730a, 730b, and 730c of multi-card display 734, thus removing the top row of cards; e.g., cards 730a, 730b, and 730c, from view on multi-card display 734.

Scenario 700 continues with clutch 742 being released while sub-focus 738 is on card 730g. Clutch 742 can be released by the wearer removing one or both of their fingers from the touch-based UI of the HMD. After clutch 742 is released, the HMD can use a single-user view to display either (a) card 730c, as the card being focused on before clutch operation 742 began, or (b) card 730g, as the card focused on using sub-focus 738 just prior to release of clutch 742. In response to clutch 742 being released for HMD embodiments not using sub-focus 738, the HMD can use a single-user view to display card 730c.

FIG. 7B shows example effects of various user interface actions with a 2D grid display of cards 750. 2D display 750, shown in the center of FIG. 7B, has a width of three cards and a height of three cards for total number of cards of 3×3=9. In other embodiments, the width and/or the height of cards can differ from the example grid shown in 2D display 750 of FIG. 7B. For example, a grid of height 2 cards and width of 3 cards can have a total number of 2×3=6 cards for display.

FIG. 7B shows that the "50" card of timeline 100 is centered within a grid or cards in 2D display 750, with a focus also shown on the "50" card using a thicker outline surrounding the "50" card than other cards in 2D display 750.

Starting from 2D display 750, a move up UI action can involve at least one of at least two operations. One operation can be a "move within grid" operation to move the focus in the direction of the UI action; in this example, move the focus from the "50" card of display 750 upward to the "47" card as shown in display 752a near the top of FIG. 7B. Another operation can be "move cards" operation so that a card in the direction of the UI action is now centered within the 2D display. Display 752b shows a result of the move cards operation, where the "47" card is shown centered within the 2D display. The other cards in the 2D display have changed accordingly—while the "46" through "54" cards of timeline 100 are shown in display 750, the effect of the move cards operation is to display the "43" through "51" cards of timeline 100 in display 752b.

FIG. 7B shows resulting displays 754a, 756a, and 758a, for respective move within grid operations for move right, move down, and move left UI actions. FIG. 7B also shows resulting displays 754b, 756b, and 758b, for respective move cards operations for move right, move down, and move left UI actions. The resulting displays 752a, 754a, 756a, 758a for move cards operations are shown in grey solely for the viewer's convenience in distinguishing those displays from resulting displays 752b, 754b, 756b, 758b for move within grid operations.

In particular embodiments, certain rows and/or columns of the grid can have missing cards, where positions for missing cards are of size zero and not utilized for displaying cards. FIG. 7C shows 2D displays 760, 762, 764, 770, 772, and 780 of cards from timeline 600, with each display configured to display part or all of a 5×5 grid of rectangular cards. Displays 760, 762, 764, 770, and 772 each display a contiguous subset of cards from timeline 600 centered at the "50" card.

Display 760, shown at upper-left of FIG. 7C, uses a "brick pattern" of cards arranged with alternating rows of partially overlapping cards, with an upper row of a pair of rows displaying four cards, and a lower row of a pair of rows displaying five cards. Display 770, shown just below display 760 in FIG. 7C, also uses a brick pattern, where the upper row of the pair of rows displays five cards, and the lower row of the pair of rows displaying four cards.

In other embodiments, more or fewer cards can be displayed in an upper row and/or a lower row of cards displayed as a brick pattern. In even other embodiments, brick patterns can be based on overlapping columns of cards rather than overlapping rows of cards. In yet other embodiments, cards of different sizes can be displayed; e.g., for displaying an "English bond" brick pattern with an upper (or lower) row of larger-sized cards and a lower (or upper) row smaller cards that partially or fully overlap the larger-sized cards in the associated row.

Display 762, shown at upper-center of FIG. 7C, uses a pyramid pattern for a 2D display of cards. The top card "46" can be displayed at a center position of a top row of display 762, the second row of cards "47" and "48" can be displayed as an row overlapping the top row in display 762, and so on down to a bottom row of the pyramid pattern including cards "56", "57", "58", "59", and "60". Display 772, shown just below display 762 in FIG. 7C, uses an inverted pyramid pattern or a 2D display of cards.

FIG. 7C also shows an order or cards displayed in display 772 that differs from the order shown in display 762. For example, let timeline 600 be ordered by time associated with each card in the timeline, and suppose each card $C_g$ in timeline 600 is associated with a time $T_g$. Then, let timeline 600 be ordered using order O1 such that a succeeding card $C_{g+1}$ adjacent to $C_g$ in timeline 600 be associated with a time $T_{g+1}$ that is later than or the same as $T_g$ and let a preceding card $C_{g-1}$ adjacent to $C_g$ in timeline 600 be associated with a time $T_{g-1}$ that is earlier than or the same as $T_g$. If time $T_g$ is the earliest time for all cards in the timeline, $C_g$ does not have a preceding card, under order O1 and if time $T_g$ is the latest time for all cards in the timeline, $C_g$ does not have a succeeding card under order O1.

For example, if card "50" of timeline 600 is card $C_g$ associated with a time of "6:00 PM yesterday", the succeeding card $C_{g+1}$ under order O1 can be card "51" associated with a time later than or equal to "6:00 PM yesterday"; e.g., "7:00 PM yesterday", and the preceding card under order O2 $C_{g-1}$ can be card "49" associated with a time earlier than or equal to "6:00 PM yesterday"; e.g., "5:00 PM yesterday".

Further, let timeline 600 be ordered using order O2 such that a succeeding card $C_{g+1}$ adjacent to $C_g$ in timeline 600 be associated with a time $T_{g+1}$ that is earlier than or the same as $T_g$ and let a preceding card $C_{g-1}$ adjacent to $C_g$ in timeline 600 be associated with a time $T_{g-1}$ that is later than or the same as $T_g$. If time $T_g$ is the earliest time for all cards in the timeline, $C_g$ does not have a succeeding card under order O2, and if time $T_g$ is the latest time for all cards in the timeline, $C_g$ does not have a preceding card under order O2. That is, order O2 reverses the order O1 of cards in timeline 600.

For example, if card "50" of timeline 600 is card $C_g$ associated with a time of "6:00 PM yesterday", the succeeding card $C_{g+1}$ under order O2 can be card "49" associated with a time earlier than or equal to "6:00 PM yesterday"; e.g., "5:00 PM yesterday", and the preceding card $C_{g-1}$ under order O2 can be card "51" associated with a time later than or equal to "6:00 PM yesterday"; e.g., "7:00 PM yesterday".

Then, cards shown in display 762 can be a subset of cards in timeline 600 ordered using order O1, and cards shown in display 772 can be a subset of cards in timeline 600 ordered using order O2; i.e., the reverse of order O1. In some embodiments, displays 762 and 772 can use the same ordering; e.g., both use order O1, both use order O2, or both use some ordering other than O1 or O2. Another example pattern of cards can be a hexagonal pattern. For example, seven cards can be arranged as hexagon within a grid of height 3 cards and width 3 cards, with two missing cards: one on the top row of the grid and one on the bottom row of the grid. If each row of cards is centered within a 2D display, then the grid can have an appearance of a hexagonal pattern as shown in Table 1 below, where each "C" is a card and the "|" marks indicate a right edge of the 2D display.

TABLE 1

| C C   | <- centered row of two cards and one missing card |
| C C C | <- centered row of three cards and zero missing cards |
| C C   | <- centered row of two cards and one missing card |

Display 764, shown at upper-right of FIG. 7C, shows a larger hexagonal pattern of five rows of cards, with top (first) and bottom (fifth) rows of the hexagonal pattern each having 3 cards, the second and fourth rows each having 4 cards, and the center (third) row having 5 cards.

In some embodiments, cards that are not adjacent in a timeline may selected for display. For example, suppose the cards of timeline 600 are arranged according to the numerical ordering shown in FIG. 6 and discussed above in that context. Then, the cards in display 780, shown at center-right of FIG. 7C, are not all adjacent to each other. For example, the HMD and/or a wearer of the HMD can select cards from a display of a timeline to be displayed on a second display of the timeline that shows the selected cards as arranged by the HMD and/or the wearer.

For example, the wearer could request the HMD display cards related to a location. The HMD can locate the requested cards, if any, and display them on the second display; e.g., such as cards 1, 2, 3, and 7 shown in display 780. Then the wearer can look at another display of timeline 600 and select additional cards for display on the second display, such as cards 10, 11, 12, 20, 22, 24, 50 and 52 shown in display 780. While viewing the second display, the wearer can control display 780 using the above-mentioned user interface actions; e.g., to move cards within display 780 into groups, blocks, rows, columns, to overlap or not overlap, etc., to add, remove, and/or update cards in display 780, to save modified cards, to discard modifications made to cards, to share cards, and/or to perform other operations related to display 780.

In some embodiments, non-rectangular cards can be used. For examples, display 790a shows use of circular-shaped cards corresponding to cards "43" through "57" of timeline 600 in a 3 row/5 column overlapping grid of cards. Display 790b shows circular-shaped cards corresponding to cards "47" to "53" of timeline 600 arranged in a hexagonal layout. Display 792 shows a hexagonal grid of hexagonally-shaped cards corresponding to cards "36" through "63" of timeline 600.

In other embodiments, one or more other shapes for cards than shown in the Figures can be used in displaying cards, such as but not limited to triangular, pentagonal, octagonal, trapezoidal, elliptical, shapes other than polygons (e.g., cards shaped like an animal, plant, vehicle, or other object(s).

FIG. 8 shows a scenario 800 for using clutch operation 830 to generate a multi-timeline display 814a, according to an example embodiment. Scenario 800 begins with an HMD displaying main timeline 810 with a focus on card 810a. During scenario 800 prior to clutch 830, the HMD displays cards in main timeline 810 using a single-card view, displaying a focused-upon card. As the focus is on card 810a, the HMD displays a single-card view of card 810a.

Scenario 800 continues with a wearer of the HMD performing clutch operation 830. Upon recognition of clutch operation 830, in scenario 800, the HMD can generate and display multi-timeline display 814a, which is shown in an expanded view as multi-timeline display 814b. In some embodiments, the HMD can focus on the entire multi-timeline display 814a using focus 816. In other embodiments, the HMD can focus a subset of cards and/or timelines, such as but not limited to, a single card, one, some, or all cards on a timeline, a column of cards across one or more timelines, a block of cards across multiple timelines, a single timeline, a group of timelines, or some other selection of cards and/or timelines, within multi-card display 814*a* using sub-focus 818.

As shown in FIG. 8 using expanded multi-timeline display 814*b*, the multi-timeline displays five timelines (TLs): timelines 820, 822, 824, 826, and 828. The multi-timeline display displays five cards for each of displayed timelines 820, 822, 824, 826, and 828. The timelines can be selected for display based on a type of object associated with a card; e.g., a timeline having only photos, only photo "bundles" or groups of photo cards, only messages, only message bundles, only cards representing active applications. Additional criteria can be used to further select items for timeline; e.g., for photo objects, some criteria can be: only photos taken before (or after) a predetermined date, within a date range, at a location, as part of a photo bundle, photos that were shared, photos that were shared and with one or more messages received in response, etc. Other criteria for photo objects and/or other types of objects are possible as well for selection in a timeline. For example, in scenario 800, all of the cards in timeline 820 represent photos in a photo bundle, all of the cards in timeline 822 represent photos taken in a given city location, and all of the cards in timeline 828 represent contacts that do not have associated photos/images.

The additional timelines presented may represent different user accounts associated with the HMD, for example, a first timeline could be cards generated by a user's work account, e.g. photos, events, contacts, email, messages, sent to or received by his/her work account, e.g. user@google.com. In this example, the HMD could be configured to allow access to multiple user accounts, such as the user's personal account, e.g. user@gmail.com; such that a second timeline accessible from the grid view could be cards generated by the user's personal account, e.g. photos, events, contacts, email, messages, sent to or received by his/her personal account. This way, the user can easily interact with the HMD via different profiles or personas, such as work or personal.

The timelines can be selected to be part or all of the main timeline; for example, FIG. 8 shows that timeline 824 includes five cards selected from main timeline 810. Cards can be selected from main timeline 810 randomly, based on focus 812, based on a type of object represented on the main timeline; e.g., select only cards representing active applications visible from the main timeline, display only menus of action cards, and/or based on other criteria. For example, in scenario 800, timeline 824 includes card 810*a*, which was the focused-on card prior to clutch 830, and the two cards on each side of card 810*a* in main timeline 810.

In some embodiments, criteria for card selection can include criteria to select cards based on according to activities taken upon selection. For example, upon selection of a bundle card representing a bundle of cards, the bundle card can be replaced by one or more of the cards the bundle card represents. An "actionable" card can be a non-bundle card that a computing device, such as an HMD, can perform one or more actions related to the actionable card. In some example scenarios, a photo related to an actionable card can be shared, deleted, named, or stored by the HMD. In some other example scenarios, a message represented by an actionable card can be accepted, rejected, or transferred by the HMD. The user interface can generate and/or use menus to represent actions that can be performed by the HMD related to the actionable card. Other criteria for selecting cards for a timeline are possible as well.

One or more timelines can act as contextual menu(s) for multi-timeline display 814*a*, including possible operations that can be performed from multi-timeline display 814*a*, operations on multi-timeline display 814*a*, and/or other operations. For example, menu 828 is displayed as a timeline and includes a menu of operations including navigate, take a video, take a photo, remove a timeline option, and add a timeline. Other operations are possible as well. For example, if clutch is engaged from card 810*a* in main timeline 810, the multi-timeline display 814*a* could present a contextual menu of operations that could be executed based off of the presently selected card 810*a*, e.g. share this card, delete the card, remove from timeline, add to bundle, etc.

In one embodiment, the wearer of the HMD can navigate around multi-timeline display 814*a*, 814*b* using head movements, such as head movements 740. For example, in scenario 800, the HMD is configured to display sub-focus 818, shown as a dotted line on both multi-timeline displays 814*a* and 814*b*, shown focusing on a single timeline; e.g., timeline 818.

In one example of scenario 800, "wrap-around" movements, or moving off the end of a row or column to the respective other end of the row or column, are enabled. Then, in response to respective head movements upward, downward, leftward, or rightward, the sub-focus 818 can move from timeline 824, as shown in FIG. 8, to respective timelines 822, 826, 822, or 826. In particular embodiments, wrap-around can be inhibited, so moving the head of the wearer leftward will not move sub-focus 818 from timeline 824 to timeline 822 and moving the head of the wearer rightward will not move sub-focus 818 from timeline 824 to timeline 826 but rather sub-focus 818 will stay on timeline 824 in response to either the leftward or the rightward movement.

In some embodiments, sub-focus 818 may not be used. For example, in these embodiments, a leftward head movement may move each of timelines 820, 822, 824, 826, 828 to the left on multi-timeline display 814*a*, 814*b* by one or more cards and a rightward head movement may move each of timelines 820, 822, 824, 826, 828 to the right on multi-timeline display 814*a*, 814*b* by one or more cards. Also in these embodiments, an upward head movement may bring a time "above" timeline 820 (not shown in FIG. 8) into view as a top-most timeline on multi-timeline display 814*a*, 814*b*, move down each of timelines 820, 822, 824, 826 by one time line on multi-timeline display 814*a*, 814*b*, and remove timeline 828 from view. Further, an upward head movement may bring a time "below" timeline 828 (not shown in FIG. 8) into view as a bottom-most timeline on multi-timeline display 814*a*, 814*b*, move up each of timelines 822, 824, 826, 828 by one time line on multi-timeline display 814*a*, 814*b*, and remove timeline 820 from view.

Other types of head movements and/or UI operations can be used as well or instead with multi-timeline display 814*a*, 814*b*, including but not limited to head movements; e.g., head movements 740, and/or UI operations that move the focus faster than and/or slower than one timeline at a time, enable navigation of cards within a timeline, which may include some or all of the navigation techniques discussed above regarding multi-card display 334*a*, 334*b*, zooming in and out, reshaping sub-focus 818, selecting card(s)/timeline(s), and deselecting card(s)/timeline(s).

Scenario 800 continues with clutch 830 being released while sub-focus 818 is on timeline 820. After clutch 830 is released, the HMD can use a single-card view to display a card on selected timeline 820.

FIG. 9 shows scenario 900 for using head movements, such as head movements 740, to navigate a multi-timeline display, according to an example embodiment. Scenario 900 begins with the HMD displaying a single-card view 904 of a contact named "George Farley" participating in a hangout, as shown at the upper-left hand corner of FIG. 9. A hangout can be indicated by the HMD using icon 904a of a camera inside of a speech balloon. Scenario 900 continues with the wearer of the HMD performing a clutch operation, or pressing two fingers on the touch-based UI of the HMD for at least one second.

After determining a clutch operation was performed, the HMD can generate multi-timeline display 906a, shown in the upper-right-hand corner of FIG. 9 as a rectangle with thick lines. Multi-timeline display 906a is shown displaying a focus 908a and parts of three timelines, including timeline (TL) 910a. In scenario 900, focus 908a, shown in FIG. 9 as a circular arrangement of gray trapezoids, rests on card 904. Focus 908a rests on card 904, as card 904 which was the card previously being displayed in a single-card view. In one embodiment, focus 908a element may not be presented.

During scenario 900, head movements can be used target items and move between levels of navigation. Each level of navigation can be represented in a multi-timeline display as one or more cards on a timeline. For example, multi-timeline display 906a shows that if the wearer made a leftward head movement, card 912a on timeline 910a, representing a navigation application/process would be centered on by focus 908a. Multi-timeline display 906a also shows that if the wearer made a rightward head movement, card 912b on timeline 910a representing a weather application would be centered on by focus 908a. Similarly, multi-timeline display 906a shows that if the wearer made respective upward or downward head movements, respective cards 912c or 912d would be centered on by focus 908a.

Scenario 900 continues with the wearer making a downward head tilt. After determining a downward head movement was performed, the HMD can move focus 908a downward onto card 912d with text of "expand". The HMD can generate multi-timeline display 906b with focus 908b on card 912d, as shown in the center-left portion of FIG. 9. Multi-timeline display 906b shows that card 912d is part of menu 910b. FIG. 9 shows menu 910b shown as a timeline of action cards that includes actions to invite, expand, end, and mute.

Menu 910b represents a contextual menu for the hangout, which includes card 912d to expand, or show other members in the hangout, invite to request other people join the hangout, end the hangout, and mute sound from one or more persons at the hangout. Below menu 910b, a card 914a representing an attendee of the hangout is shown, in part to represent the next level of navigation if the wearer were to decide to make another downward head motion.

Scenario 900 continues with the wearer of the HMD making another downward head motion. After determining a downward head movement was performed, the HMD can move focus 908b downward onto card 914a, which represents George Farley as a hangout attendee.

The HMD can generate multi-timeline display 906c with focus 908c on card 914a, as shown in the center-right portion of FIG. 9. Multi-timeline display 906c shows that card 914a is part of timeline 910c, which represents attendees of the hangout. FIG. 9 shows that there are three other attendees at the hangout beyond the wearer: Pieter Vrijman represented by card 914b, George Farley represented by card 914a, and Richard The, who is represented by card 914c. Below card 914a is card 916a with text of "mute", representing a contextual menu of operations regarding attendees of hangouts. Card 916a also represents the next level of navigation if the wearer were to decide to make another downward head motion.

Scenario 900 continues with the wearer of the HMD making a rightward head motion. After determining a rightward head movement was performed, the HMD can move focus 908c rightward onto card 914c, which represents Richard The. The HMD can generate multi-timeline display 906d with focus 908d on card 914c, as shown in the lower-left corner of FIG. 9. Below card 914c is card 916b with text of "mute", representing a contextual menu of operations regarding attendees of hangouts and the next level of navigation corresponding to downward head movements.

Scenario 900 continues with the wearer releasing his/her fingers from the touch-based UI of the HMD, thereby ending the clutch operation. After determining the clutch operation has completed, the HMD can revert to a single-card view as shown at the lower right hand corner of FIG. 9. In some embodiments, the single-card view can view the last-focused card during multi-timeline display. For example, the last focus; e.g., focus 908d, during multi-timeline display was on card 914c representing Richard The. Then, the single-card view can display last-focused card 916c in a single-card view to end scenario 900.

E. Example Methods of Operation

Figure 10A:
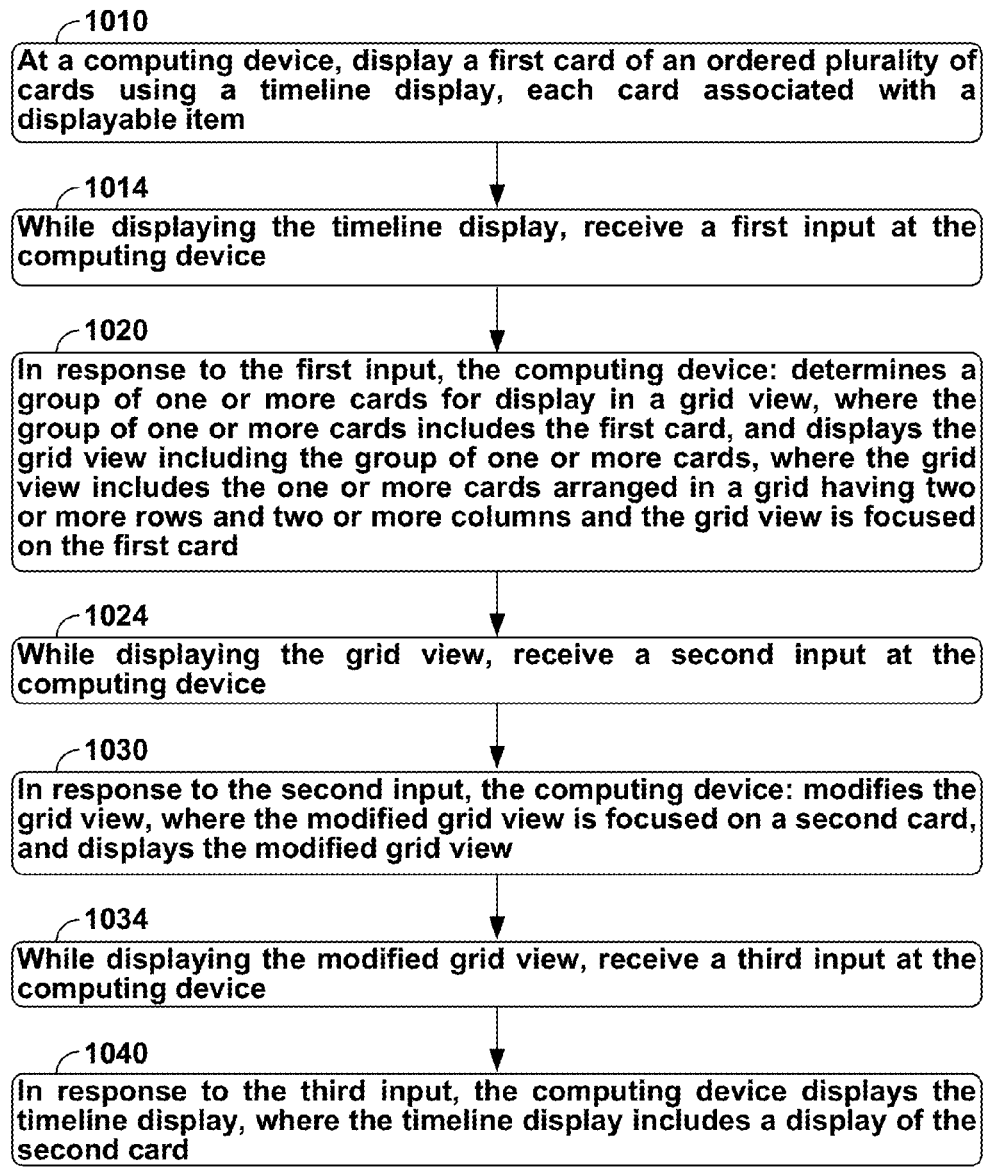
FIG. 10A is a flow chart illustrating a method, according to an example embodiment.

FIG. 10A is a flow chart illustrating method 1000, according to an example embodiment. In FIG. 10A, method 1000 is described by way of example as being carried out by a computing device, such as a wearable computer and possibly a wearable computer embodied as a HMD; e.g., HMD 260. However, it should be understood that example methods, such as but not limited to method 1000, may be carried out by a wearable computer without wearing the computer. For example, such methods may be carried out by simply holding the wearable computer using the wearer's hands. Other possibilities may also exist.

Further, example methods, such as but not limited to method 1000, may be carried out by a computing device other than a wearable computer, and/or may be carried out by sub-systems in a wearable computer or in other devices. For example, an example method may alternatively be carried out by a device such as a mobile phone, which is programmed to simultaneously display a graphic object in a graphic display and also provide a point-of-view video feed in a physical-world window. Other examples are also possible.

As shown in FIG. 10A, method 1000 begins at block 1010, where a computing device can display a first card of an ordered plurality of cards using a timeline display, such as discussed above in the context of FIGS. 3-9. Each card can be associated with a displayable item. In some embodiments, the timeline display can include a single-card display, such as discussed above in the context of FIGS. 3, 5, and 6.

At block 1014, the computing device can receive a first input while displaying the timeline display, such as discussed above in the context of at least FIGS. 3-9.

At block 1020, in response to the first input, the computing device can determine a group of one or more cards for display in a grid view, where the group of one or more cards can include the first card, and display the grid view including the group of one or more cards, such as discussed above in the context of at least FIGS. 6-7C. The grid view can include the one or more cards arranged in a grid having two or more rows and two or more columns. The grid view can be focused on the first card.

In some embodiments, the grid view can include a grid of cards that has a grid height of greater than 0 cards and has a grid width of greater than 0 cards, such as discussed above in the context of at least FIGS. 6-7C. In particular embodiments, determining the group of one or more cards can include determining a number of cards for the group of one or more cards equal to the grid height times the grid width, such as discussed above in the context of at least FIG. 7B. In other particular embodiments, modifying the grid view can include: receiving a fourth input to move left within the grid of cards; and in response to the fourth input, changing a focus of the grid view from the second card to a card immediately to left of the second card, such as discussed above in the context of at least FIG. 7B.

In still other particular embodiments, modifying the grid view can include: receiving a fifth input to move cards left; and in response to the fifth input, changing a focus of the grid view from the second card to a card immediately to left of the second card, re-selecting the number of cards from the group of one or more cards, where the re-selected number of cards includes the card immediately to the left of the second card, and displaying the re-selected number of cards in the grid view, where the card immediately to the left is displayed in a center of the grid view, such as discussed above in the context of at least FIG. 7B. In even other particular embodiments, the grid view can be configured to display the number of cards, such as discussed above in the context of at least FIG. 7B.

In yet other particular embodiments, the grid view can be configured to display less than the number of cards, such as discussed above in the context of at least FIG. 7C. The grid view can be configured to display a first number of cards in a first row of the grid view and can be configured to display a second number of cards in a second row of the grid view. The first number of cards can differ from the second number of cards, and wherein at least one of the first number of cards and the second number of cards is less than the grid width.

In other embodiments, the grid view can be configured to display one or more circular-shaped cards card in an a hexagonal layout, such as discussed above in the context of at least FIG. 7C. In still other embodiments, the grid view can be configured to display a card having a hexagonal shape, such as discussed above in the context of at least FIG. 7C.

At block 1024, the computing device can receive a second input while displaying the grid view.

At block 1030, in response to the second input, the computing device can modify the grid view, where the modified grid view can be focused on a second card and display the modified grid view.

At block 1034, the computing device can receive a third input while displaying the modified grid view.

At block 1040, in response to the third input, the computing device can display the timeline display, where the timeline display can include a display of the second card.

In some embodiments, method 1000 can also include displaying the second card in a single card view using a first format. An input to zoom in on the second card can be received. In response to the input to zoom in, the second card can be displayed using a second format, where the second format is configured to enable display of additional information than enabled by the first format, such as discussed above in the context of at least FIG. 3B.

In other embodiments, method 1000 can also include displaying the second card in a single card view using a first format. An input to zoom out on the second card can be received. In response to the input to zoom out, the second card can be displayed using a third format, where the first format is configured to enable display of additional information than enabled by the third format, such as discussed above in the context of at least FIG. 3B.

Figure 10B:
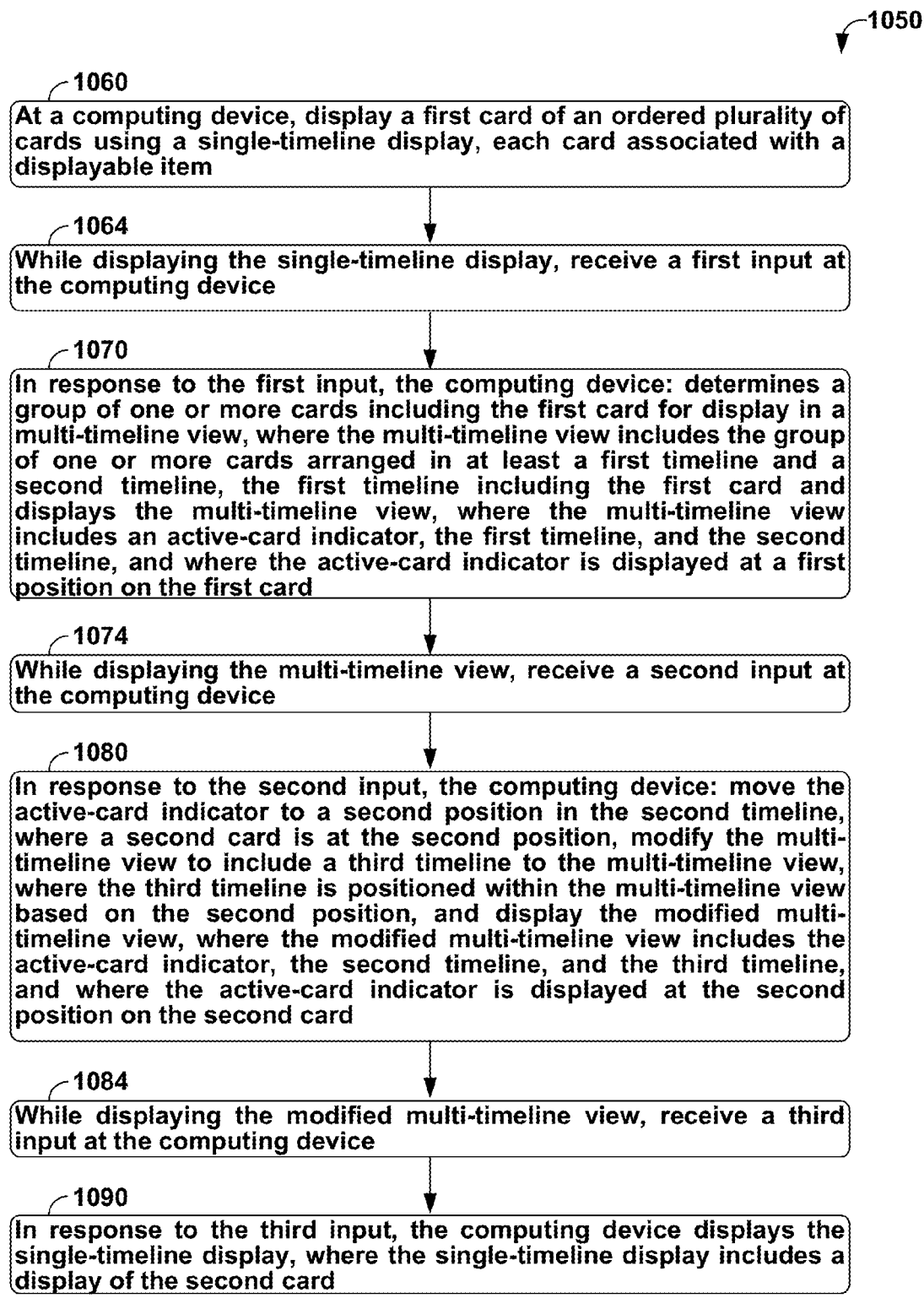
FIG. 10B is a flow chart illustrating another method, according to an example embodiment.

FIG. 10B is a flowchart illustrating method 1050, according to an example embodiment. In FIG. 10B, method 1050 is described by way of example as being carried out by a computing device, such as a wearable computer and possibly a wearable computer embodied as a HMD; e.g., HMD 260. However, it should be understood that example methods, such as but not limited to method 1050, may be carried out by a wearable computer without wearing the computer. For example, such methods may be carried out by simply holding the wearable computer using the wearer's hands. Other possibilities may also exist.

Further, example methods, such as but not limited to method 1050, may be carried out by a computing device other than a wearable computer, and/or may be carried out by sub-systems in a wearable computer or in other devices. For example, an example method may alternatively be carried out by a device such as a mobile phone, which is programmed to simultaneously display a graphic object in a graphic display and also provide a point-of-view video feed in a physical-world window. Other examples are also possible.

As shown in FIG. 10B, method 1050 begins at block 1060, where a computing device can display a first card of an ordered plurality of cards using a single-timeline display, such as discussed above in the context of at least FIGS. 3-9. Each card can be associated with a displayable item.

At block 1064, the computing device can receive a first input while displaying the single-timeline display, such as discussed above in the context of at least FIGS. 3-9.

At block 1070, in response to the first input, the computing device can determine a group of one or more cards for display in a multi-timeline view, where the group of one or more cards can include the first card, where the multi-timeline view can include the group of one or more cards arranged in at least a first timeline and a second timeline, and where the first timeline can include the first card, such as discussed above in the context of at least FIGS. 8 and 9. The computing device can display the multi-timeline view. The multi-timeline view can include an active-card indicator, the first timeline, and the second timeline. The active-card indicator can be displayed at a first position on the first card.

In some embodiments, determining the group of one or more cards can include: determining a number of timelines and a maximum number of cards per timeline to be displayed in the multi-timeline view, determining a selection criteria for each timeline of the number of timelines, and for each timeline of the number of timelines, selecting no more than a maximum number of cards from the ordered plurality of cards for the timeline based on the selection criteria for the timeline, such as discussed above in the context of at least FIG. 8. In particular embodiments, the selection criteria for the timeline can include criteria for a specific based on an activity taken upon selection of the specific card, such as discussed above in the context of at least FIG. 8.

At block 1074, the computing device can receive a second input while displaying the multi-timeline view, such as discussed above in the context of at least FIG. 9.

At block 1080, in response to the second input, the computing device can move the active-card indicator to a second position in the second timeline, where a second card is at the second position, such as discussed above in the context of at least FIG. 9. The computing device can modify the multi-timeline view to include a third timeline to the multi-timeline view. The third timeline can be positioned within the multi-timeline view based on the second position. The computing device can display the modified multi-timeline view. The modified multi-timeline view can include the active-card indicator, the second timeline, and the third timeline. The active-card indicator can be displayed at the second position on the second card.

At block 1084, the computing device can receive a third input while displaying the modified multi-timeline view, such as discussed above in the context of at least FIG. 9.

At block 1090, in response to the third input, the computing device can display the single-timeline display, where the timeline display can include a display of the second card, such as discussed above in the context of at least FIG. 9.

In some embodiments, method 1050 can also include displaying the second card in a single card view using a first format. An input to zoom in on the second card can be received. In response to the input to zoom in, the second card can be displayed using a second format, where the second format is configured to enable display of additional information than enabled by the first format, such as discussed above in the context of at least FIG. 3B.

In other embodiments, method 1000 can also include displaying the second card in a single card view using a first format. An input to zoom out on the second card can be received. In response to the input to zoom out, the second card can be displayed using a third format, where the first format is configured to enable display of additional information than enabled by the third format, such as discussed above in the context of at least FIG. 3B.

F. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

It will be readily understood that the aspects of the present disclosure, as generally described herein, and illustrated in the figures, can be arranged, substituted, combined, separated, and designed in a wide variety of different configurations, all of which are explicitly contemplated herein. While various aspects and embodiments have been disclosed herein, other aspects and embodiments will be apparent to those skilled in the art.

Example methods and systems are described above. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Reference is made herein to the accompanying figures, which form a part thereof. In the figures, similar symbols typically identify similar components, unless context dictates otherwise. Other embodiments may be utilized, and other changes may be made, without departing from the spirit or scope of the subject matter presented herein. The various aspects and embodiments disclosed herein are for purposes of illustration and are not intended to be limiting, with the true scope and spirit being indicated by the following claims.

The invention claimed is:

1. A method, comprising:
at a computing device, displaying a first card of an ordered plurality of cards using a timeline display, each card associated with a displayable item, wherein the computing device is a head-mountable device;
while displaying the timeline display, receiving a first input at the computing device;
in response to the first input, the computing device:
determining a first group of one or more cards for display in a grid view, wherein the first group of one or more cards includes the first card, and
displaying the grid view including the first group of one or more cards, wherein the grid view includes the first group of one or more cards arranged in a grid having two or more rows and two or more columns and the grid view is focused on the first card, and wherein the display of the grid view is different from the display of the first card using the timeline display;
while displaying the grid view, receiving a second input at the computing device;
in response to the second input, the computing device:
modifying the grid view, wherein the modified grid view is focused on a second card, and
displaying the modified grid view;
while displaying the modified grid view, receiving a third input to move the cards left or a fourth input to move the cards right;
in response to receiving the third input:
changing a focus from the second card to a card immediately to the left of the second card,
determining a second group of one or more cards, wherein the second group of one or more cards is different from the first group of one or more cards, and comprises the card immediately to the left of the second card, and
displaying the second group of one or more cards in the grid view, wherein the card immediately to the left of the second card is displayed in a center of the grid view;
in response to receiving the fourth input;
changing a focus from the second card to a card immediately to the right of the second card,
determining a third group of one or more cards, wherein the third group of one or more cards is different from the first group of one or more cards, and comprises the card immediately to the right of the second card, and
displaying the third group of one or more cards in the grid view, wherein the card immediately to the right of the second card is displayed in a center of the grid view;
while displaying the second group of one or more cards or the third group of one or more cards, receiving a fifth input at the computing device; and
in response to the fifth input, the computing device:
displaying the timeline display, wherein the timeline display comprises a display of a card in the second group of one or more cards or a card in the third group of one or more cards.

2. The method of claim 1, wherein the grid view comprises a grid of cards having a grid height of greater than zero cards and having a grid width of greater than zero cards.

3. The method of claim 2, wherein determining the first group of one or more cards comprises determining a number of cards for the first group equal to the grid height times the grid width.

4. The method of claim 1, wherein the ordered plurality of cards is a one-dimensional array of cards organized by time.

5. The method of claim 3, wherein the grid view is configured to display less than the number of cards, wherein the grid view is configured to display a first number of cards in a first row of the grid view and to display a second number of cards in a second row of the grid view, and wherein the first number of cards differs from the second number of cards.

6. The method of claim 1, wherein the timeline display comprises a single-card display.

7. The method of claim 1, wherein the grid view is configured to display one or more circular-shaped cards card in a hexagonal layout.

8. The method of claim 1, further comprising:
displaying the second card in a single-card display using a first format;
receiving a sixth input to zoom in on the second card;
in response to the sixth input, displaying the second card using a second format, wherein the second format is configured to enable display of additional information than enabled by the first format.

9. The method of claim 1, further comprising:
displaying the second card in a single card view using a first format;
receiving a sixth input to zoom out on the second card;
in response to the sixth input, displaying the second card using a second format, wherein the first format is configured to enable display of additional information than enabled by the second format.

10. A method, comprising:
at head-mountable device, displaying a first card of an ordered plurality of cards using a single-timeline display, each card associated with a displayable item;
while displaying the single-timeline display, providing a first input to the head-mountable device;
in response to the first input, the head-mountable device:
determining a group of one or more cards comprising the first card for display in a multi-timeline view, wherein the multi-timeline view comprises the group of one or more cards arranged in at least a first timeline and a second timeline, the first timeline comprising the first card, and
displaying the multi-timeline view, wherein the multi-timeline view comprises an active-card indicator, the first timeline, and the second timeline, and wherein the active-card indicator is displayed at a first position on the first card;
while displaying the multi-timeline view, providing a second input to the head-mountable device;
in response to the second input, the head-mountable device:
moving the active-card indicator to a second position in the second timeline, wherein a second card is at the second position,
modifying the multi-timeline view to include a third timeline to the multi-timeline view, wherein the third timeline is positioned within the multi-timeline view based on the second position, and displaying the modified multi-timeline view, wherein the modified multi-timeline view comprises the active-card indicator, the second timeline, and the third timeline, and wherein the active-card indicator is displayed at the second position on the second card;

while displaying the modified multi-timeline view, providing a third input to the head-mountable device; and in response to the third input, the head-mountable device:

displaying the single-timeline display, wherein the single-timeline display comprises a display of the second card.

11. The method of claim 10, wherein determining the group of one or more cards comprises:

determining a number of timelines and a maximum number of cards per timeline to be displayed in the multi-timeline view;

determining a selection criteria for each timeline of the number of timelines; and for each timeline of the number of timelines, selecting no more than a maximum number of cards from the ordered plurality of cards for the timeline based on the selection criteria for the timeline.

12. The method of claim 11, wherein the selection criteria for the timeline comprises criteria based on an activity taken upon selection of a specific card.

13. A non-transitory computer-readable storage medium having stored thereon program instructions that, upon execution by a processor of a head-mountable computing device, cause the computing device to perform functions comprising:

displaying a first card of an ordered plurality of cards using a timeline display, each card associated with a displayable item;

while displaying the timeline display, receiving a first input;

in response to the first input:

determining a first group of one or more cards for display in a grid view, wherein the first group of one or more cards includes the first card, and displaying the grid view including the first group of one or more cards, wherein the grid view includes the first group of one or more cards arranged in a grid having two or more rows and two or more columns and the grid view is focused on the first card, and wherein the grid view is different from the display of the first card using the timeline display;

while displaying the grid view, receiving a second input;

in response to the second input:

modifying the grid view, wherein the modified grid view is focused on a second card, and displaying the modified grid view;

while displaying the modified grid view, receiving a third input to move the cards left or a fourth input to move the cards right;

in response to receiving the third input:

changing a focus from the second card to a card immediately to the left of the second card, determining a second group of one or more cards, wherein the second group of one or more cards is different from the first group of one or more cards, and comprises the card immediately to the left of the second card, and displaying the second group of one or more cards in the grid view, wherein the card immediately to the left of the second card is displayed in a center of the grid view;

in response to receiving the fourth input:

changing a focus from the second card to a card immediately to the right of the second card, determining a third group of one or more cards, wherein the third group of one or more cards is different from the first group of one or more cards, and comprises the card immediately to the right of the second card, and displaying the third group of one or more cards in the grid view, wherein the card immediately to the right of the second card is displayed in a center of the grid view;

while displaying the second group of one or more cards or the third group of one or more cards, receiving a fifth input; and in response to the fifth input:

displaying the timeline display, wherein the timeline display comprises a display of a card in the second group of one or more cards or a card in the third group of one or more cards.

14. The non-transitory computer-readable storage medium of claim 13, wherein the grid view comprises a grid of cards that has a grid height of greater than zero cards and a grid width of greater than zero cards.

15. The non-transitory computer-readable storage medium of claim 14, wherein determining a group of one or more cards for display in a grid view comprises determining a number of cards for the group equal to the grid height times the grid width.

16. The non-transitory computer-readable storage medium of claim 13, wherein the ordered plurality of cards is a one-dimensional array of cards organized by time.

17. The non-transitory computer-readable storage medium of claim 15, wherein the grid view is configured to display less than the number of cards, and wherein the grid view is configured to display a first number of cards in a first row of the grid view and a second number of cards in a second row of the grid view, wherein the first number of cards differs from the second number of cards, and wherein at least one of the first number of cards and the second number of cards is less than the grid width.

18. The non-transitory computer-readable storage medium of claim 13, wherein the timeline display comprises a single-card display.

* * * * *